(12) United States Patent
Inoue et al.

(10) Patent No.: US 7,586,522 B2
(45) Date of Patent: Sep. 8, 2009

(54) IMAGE PROCESSING DEVICE

(75) Inventors: Jun Inoue, Akiruno (JP); Osamu Inagaki, Hachioji (JP); Shinichi Nakajima, Koganei (JP); Hiroki Shibasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 386 days.

(21) Appl. No.: 11/704,467

(22) Filed: Feb. 9, 2007

(65) Prior Publication Data
US 2007/0132859 A1 Jun. 14, 2007

Related U.S. Application Data

(62) Division of application No. 10/077,445, filed on Feb. 15, 2002, now Pat. No. 7,176,966.

(30) Foreign Application Priority Data
Feb. 16, 2001 (JP) ............... 2001-040500

(51) Int. Cl.
*H04N 5/228* (2006.01)
*H04N 9/09* (2006.01)
*H04N 5/225* (2006.01)

(52) U.S. Cl. ............ 348/222.1; 348/265; 348/360
(58) Field of Classification Search .......... 348/222.1, 348/262–265, 360, 403.1
See application file for complete search history.

(56) References Cited

U.S. PATENT DOCUMENTS

| | | | | |
|---|---|---|---|---|
| 5,357,282 A | * | 10/1994 | Lee | 348/403.1 |
| 5,379,070 A | * | 1/1995 | Retter et al. | 375/240.2 |
| 5,436,661 A | * | 7/1995 | Yamamoto et al. | 348/264 |
| 5,669,010 A | * | 9/1997 | Duluk, Jr. | 712/22 |
| 5,703,648 A | * | 12/1997 | Shikakura | 375/240.03 |
| 6,020,922 A | * | 2/2000 | Lee | 348/265 |
| 6,611,289 B1 | * | 8/2003 | Yu et al. | 348/265 |
| 6,697,115 B1 | * | 2/2004 | Amano | 348/360 |
| 7,015,966 B1 | * | 3/2006 | Lin | 348/324 |
| 7,027,665 B1 | * | 4/2006 | Kagle et al. | 382/284 |
| 7,176,966 B2 | * | 2/2007 | Inoue et al. | 348/222.1 |

* cited by examiner

*Primary Examiner*—Sinh N Tran
*Assistant Examiner*—Daniel M Pasiewicz
(74) *Attorney, Agent, or Firm*—Straub & Pokotylo; John C. Pokotylo

(57) ABSTRACT

In short, the image processing device for obtaining a single image by using a plurality of image-pickup elements comprises a plurality of image-pickup signal processing circuits that are provided for each of the image-pickup elements, an image arrangement conversion circuit which converts the read-out order of the images corresponding to the respective image-pickup elements that are output from the image-pickup signal processing circuits, an image splitting processing circuit for performing image splitting on the image that is output from the image arrangement conversion circuit, an image processing circuit for performing image processing in parallel on each of the split images, and an image compression circuit for compressing in parallel each of the split images that are output from the image processing circuit.

2 Claims, 33 Drawing Sheets

FIG.2
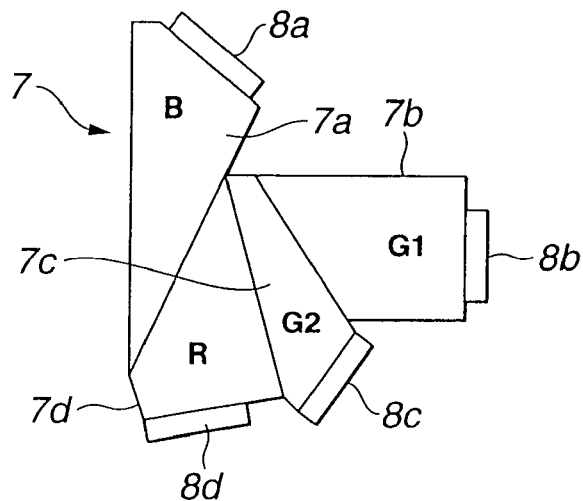
FIG.3A
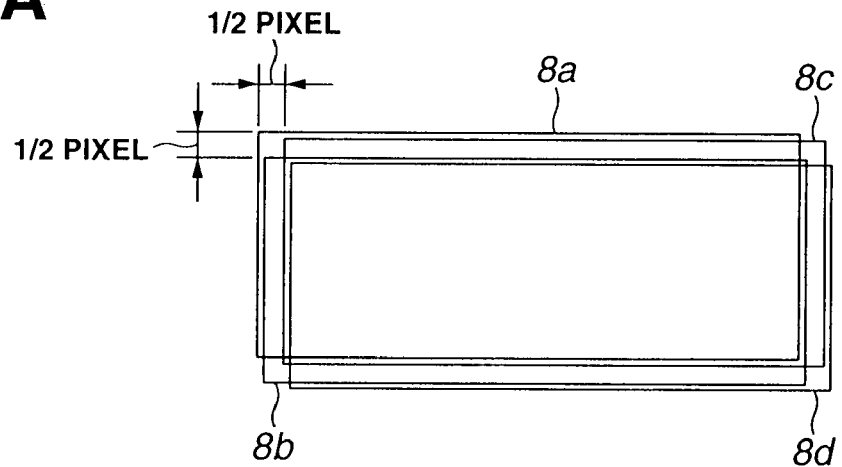
FIG.3B
| a | c | a | c |
|---|---|---|---|
| b | d | b | d |
| a | c | a | c |
| b | d | b | d |

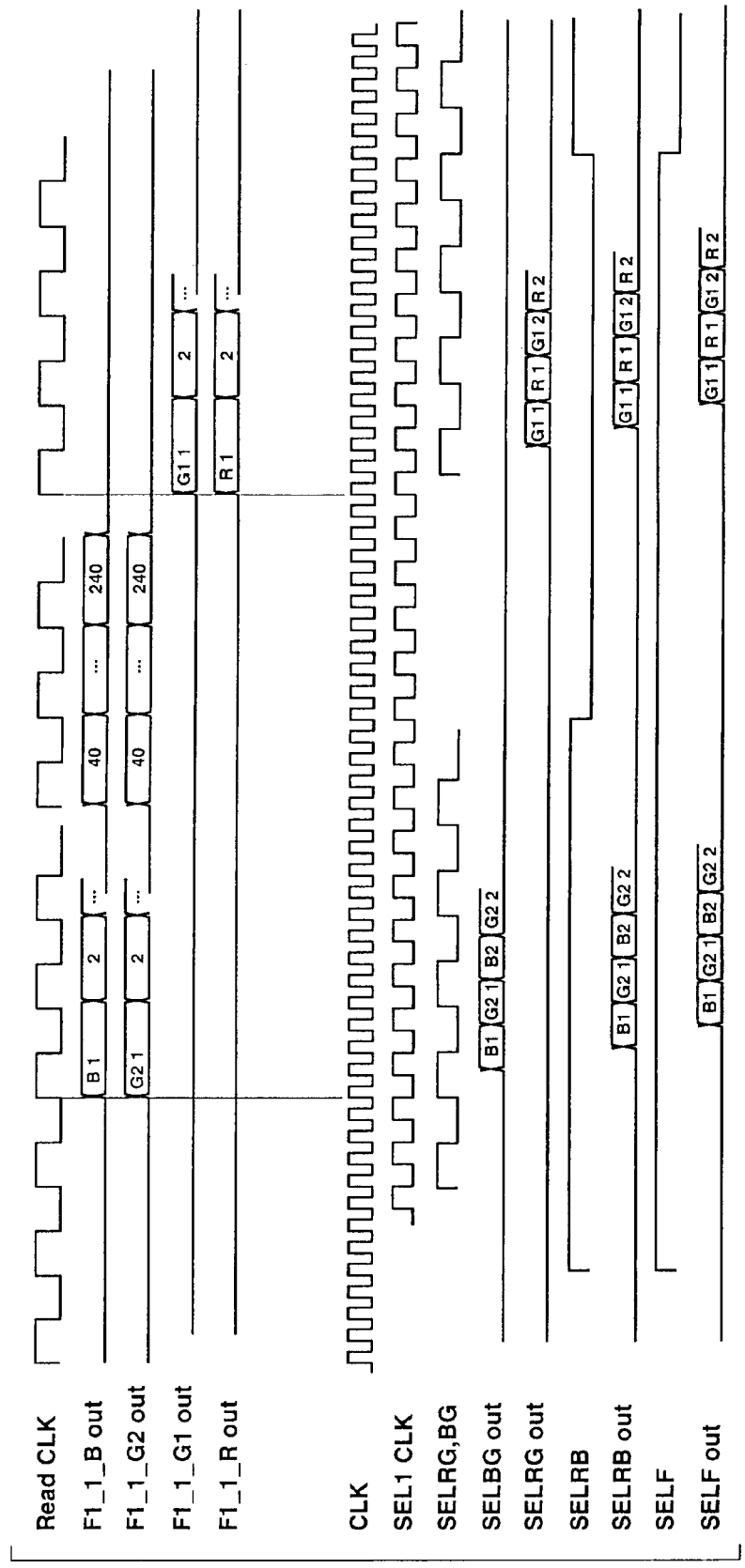

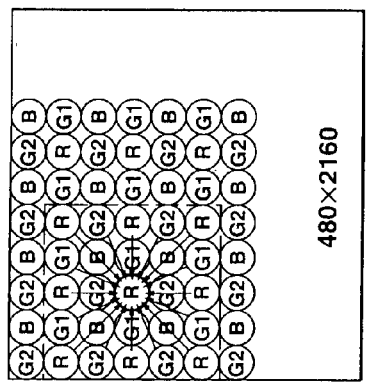
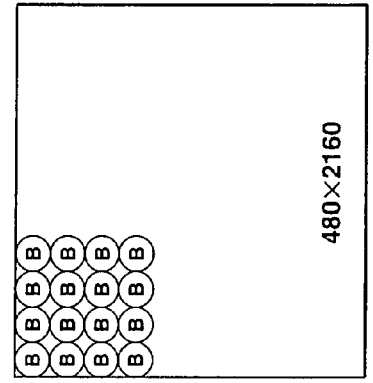
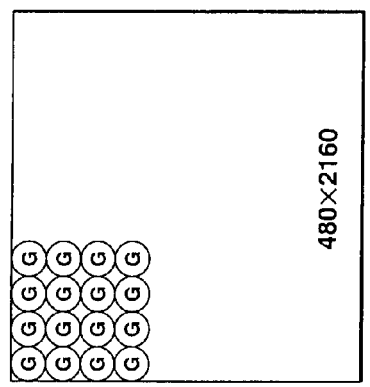
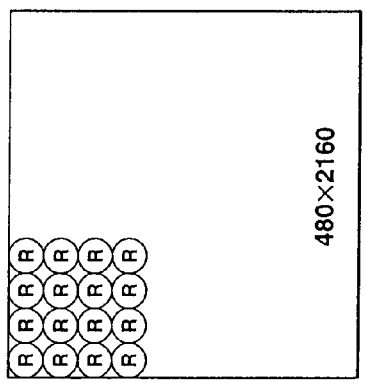

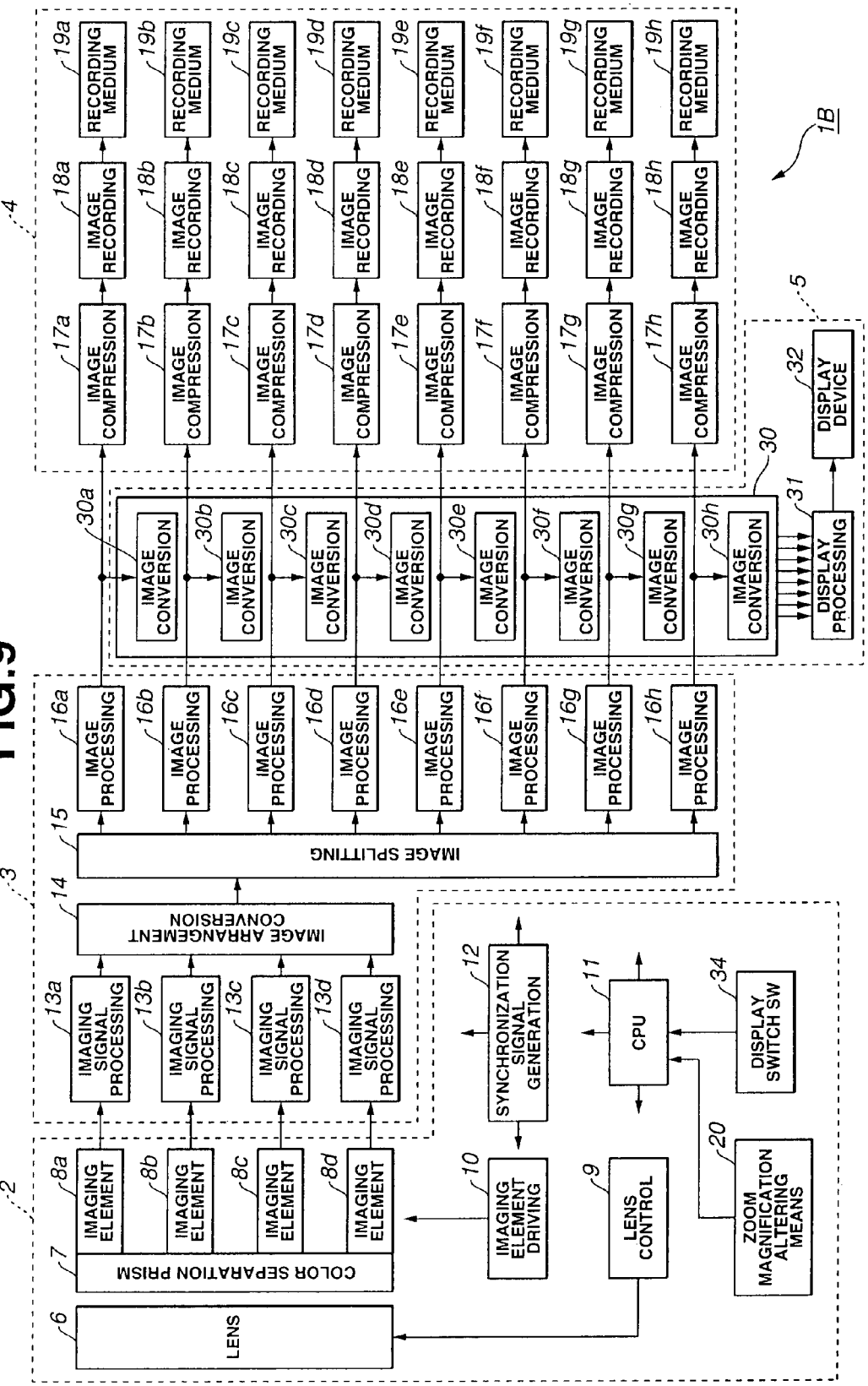

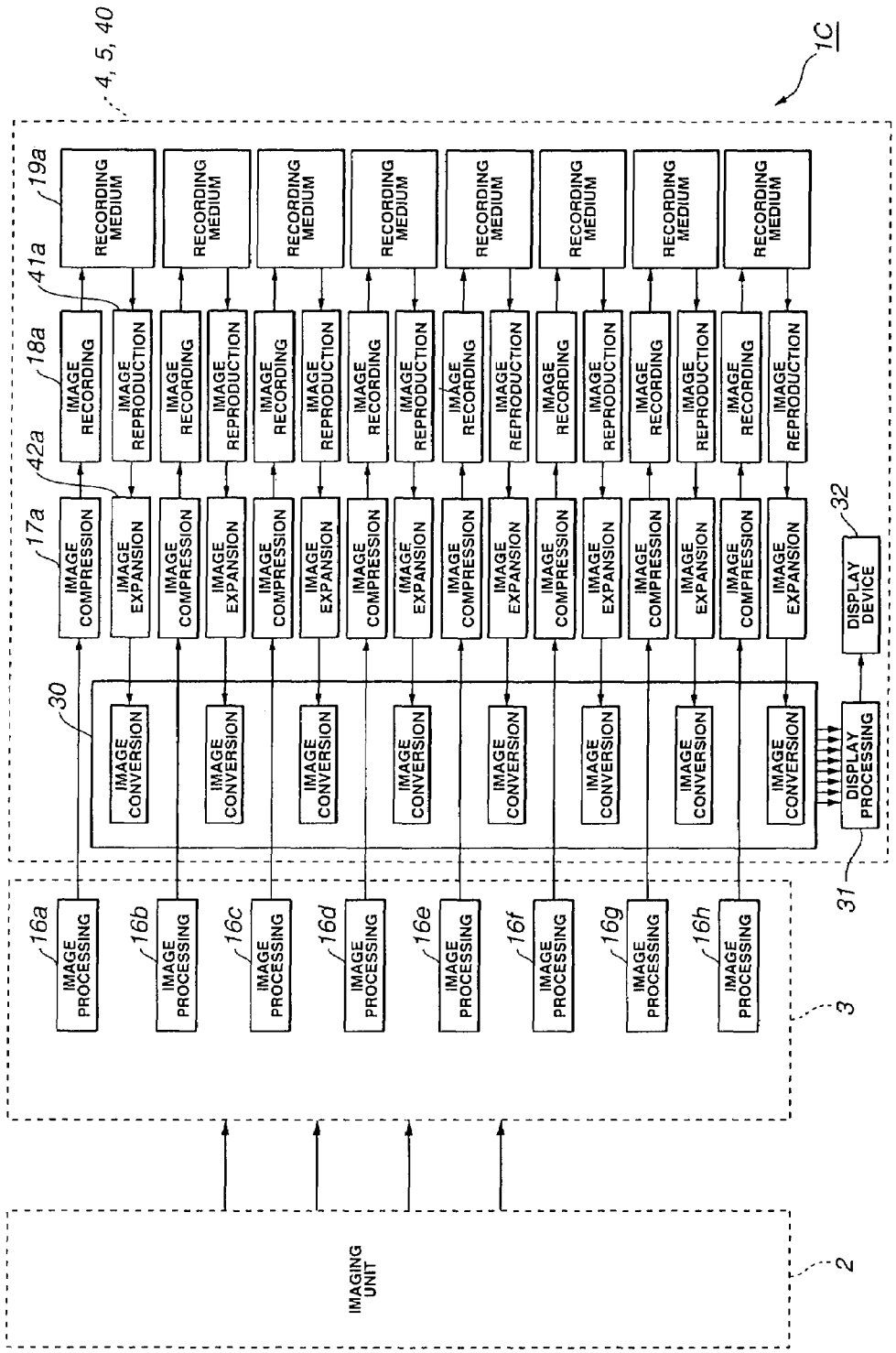

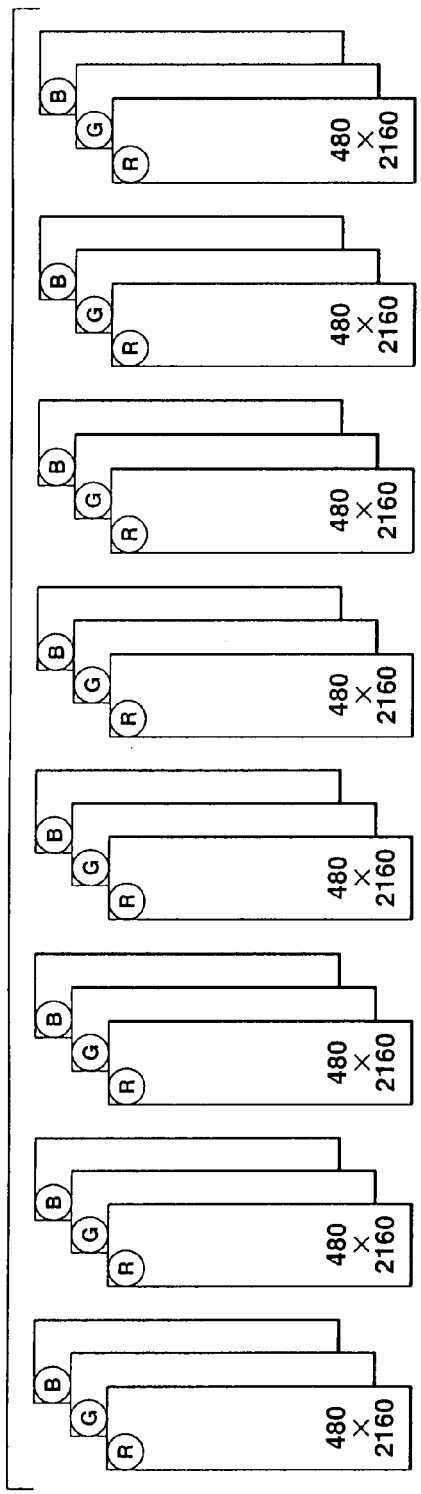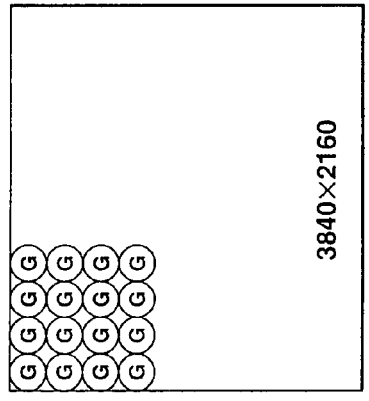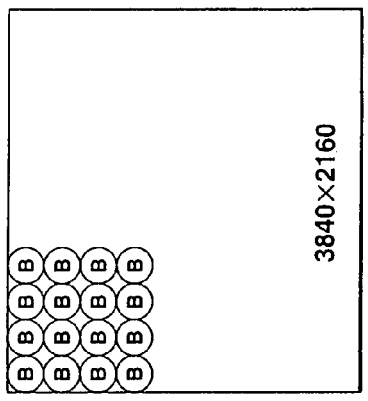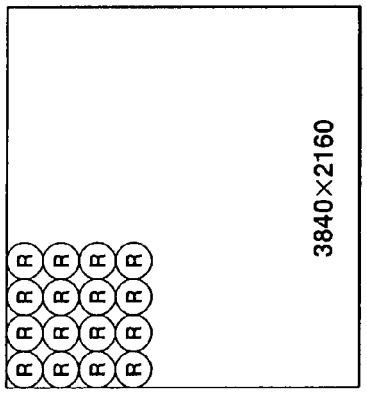

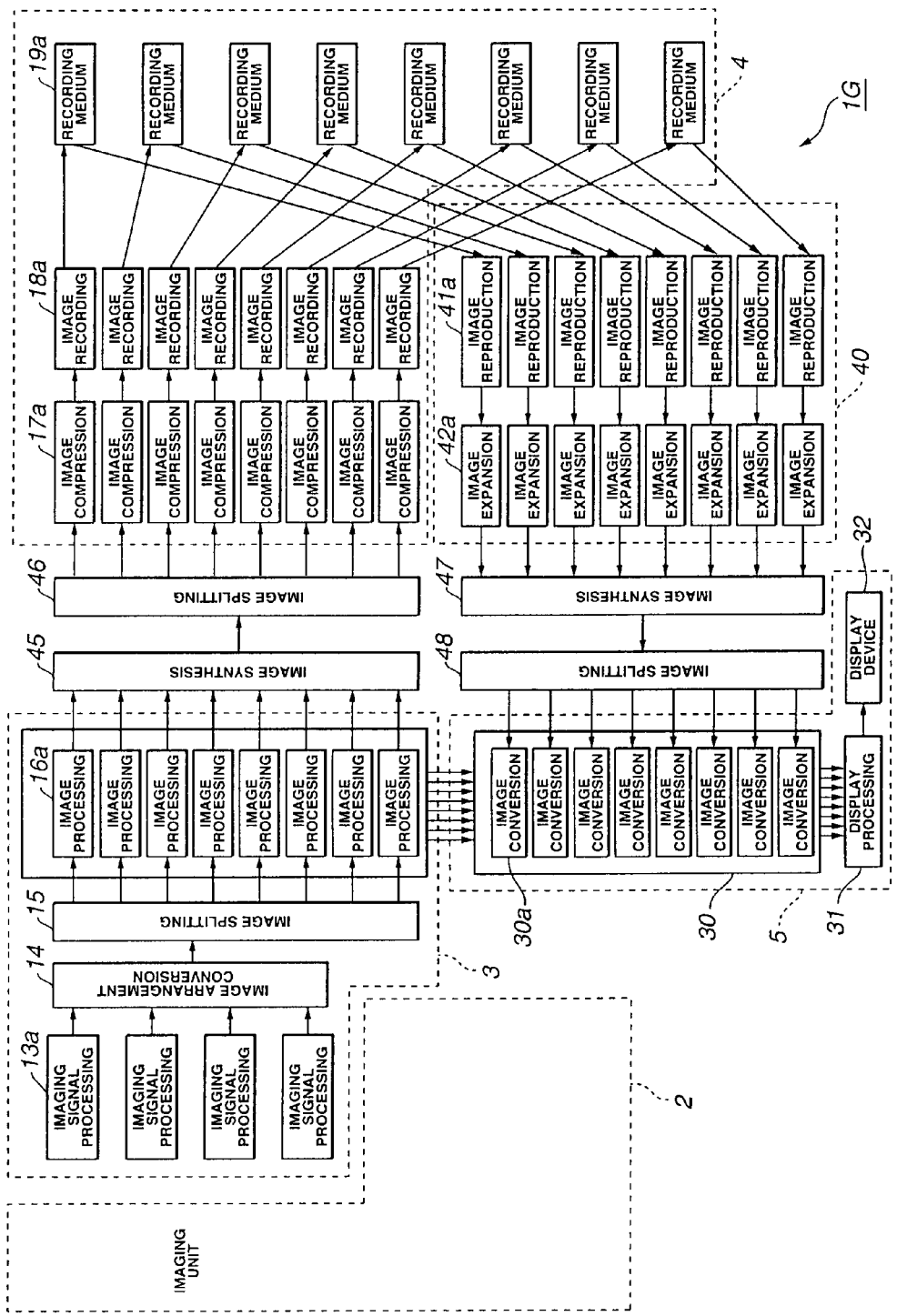

FIG.25A
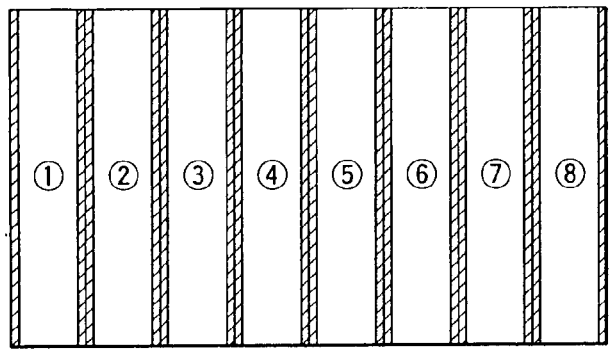
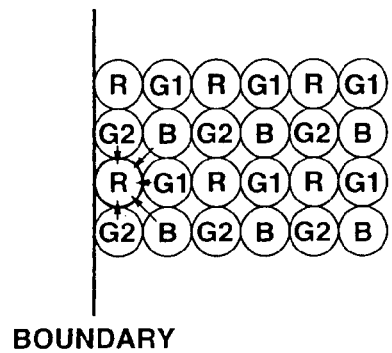
NO OVERLAPPING
BOUNDARY
FIG.25B
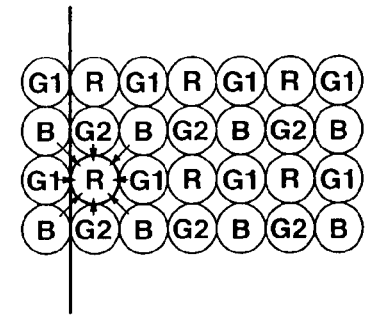
OVERLAPPING PRESENT
BOUNDARY
FIG.25C
FIG.27
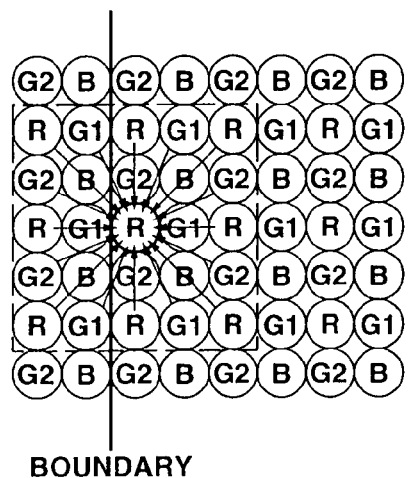
BOUNDARY

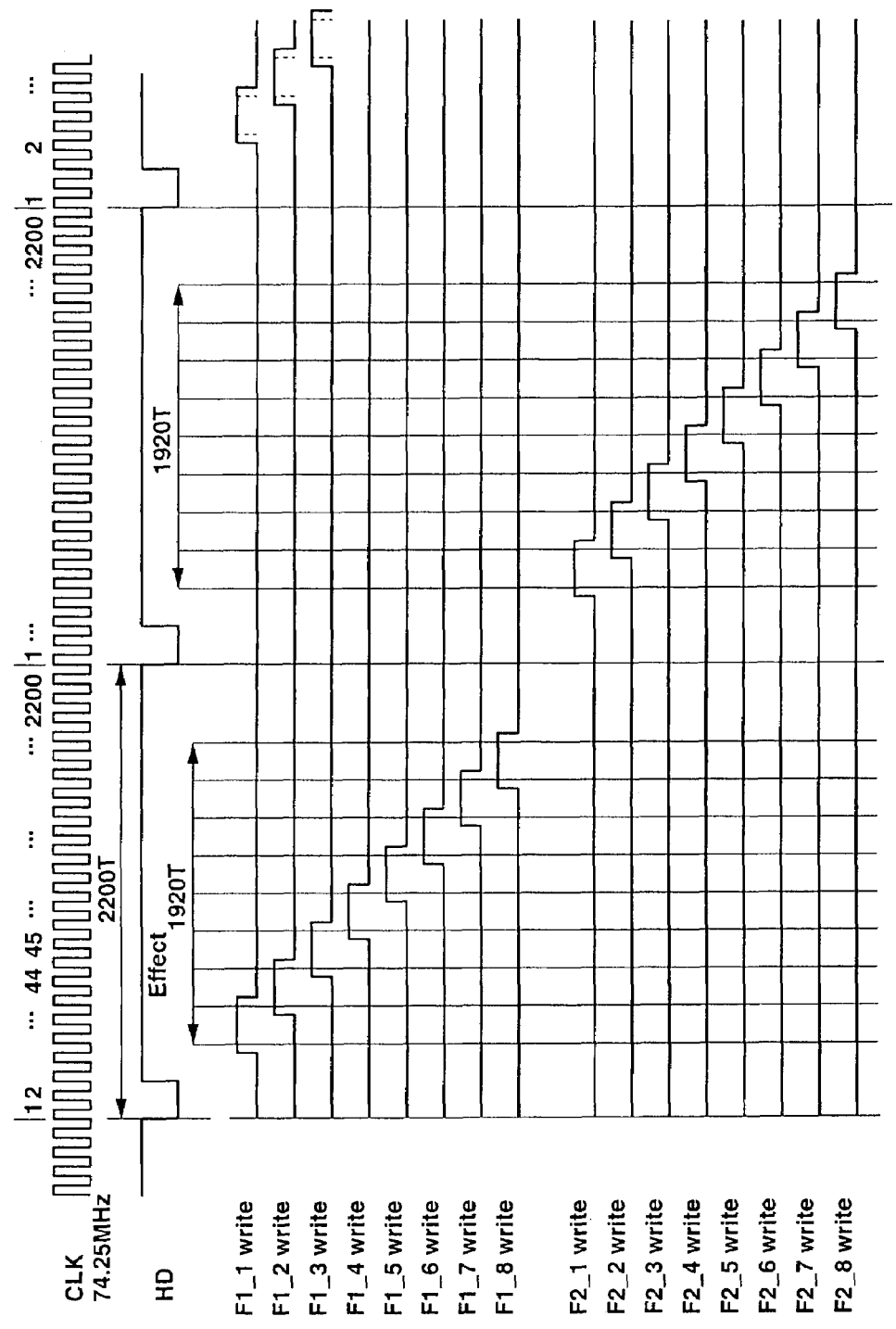

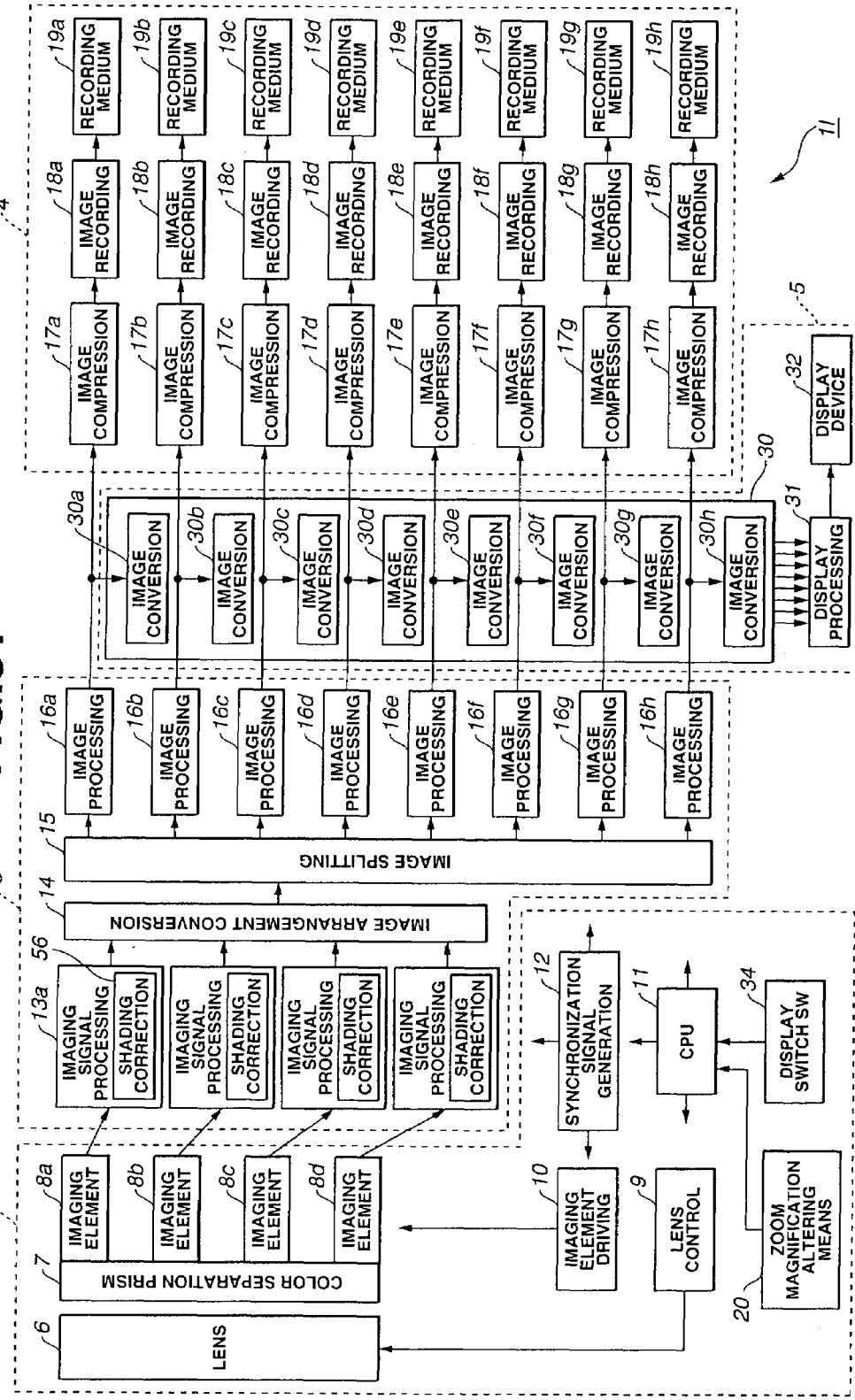

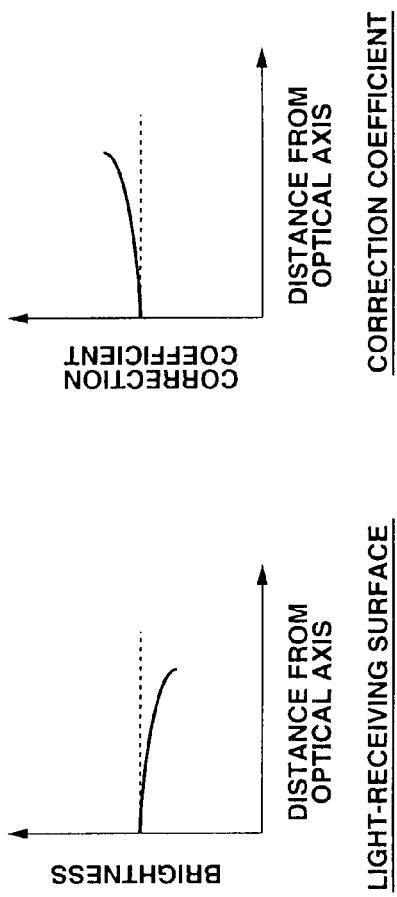
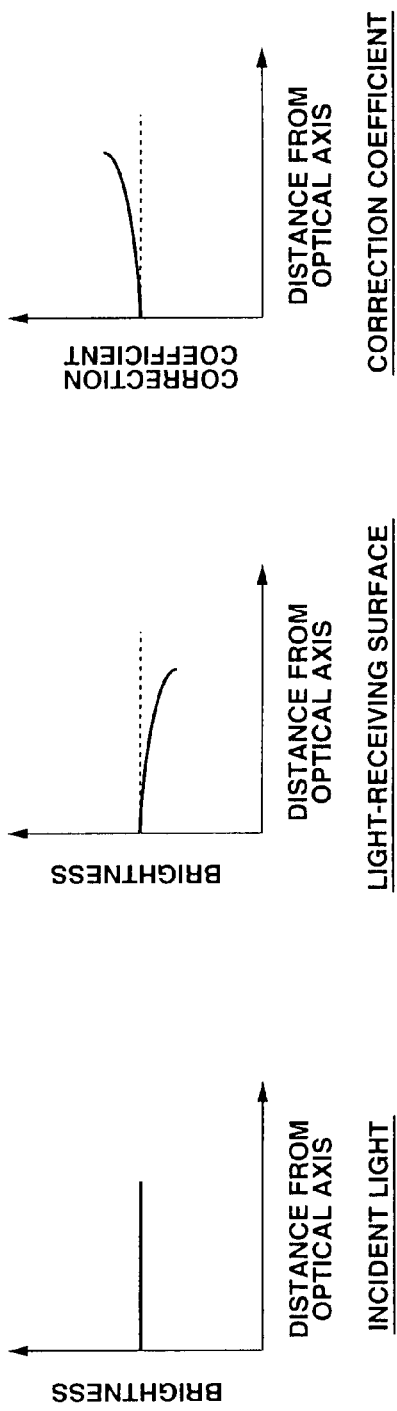
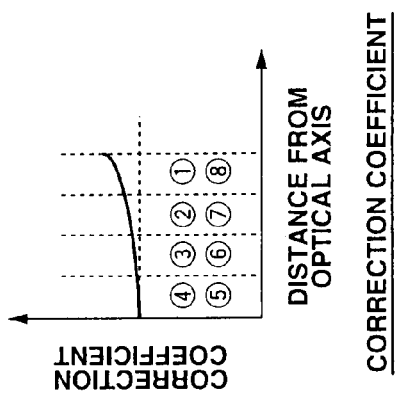

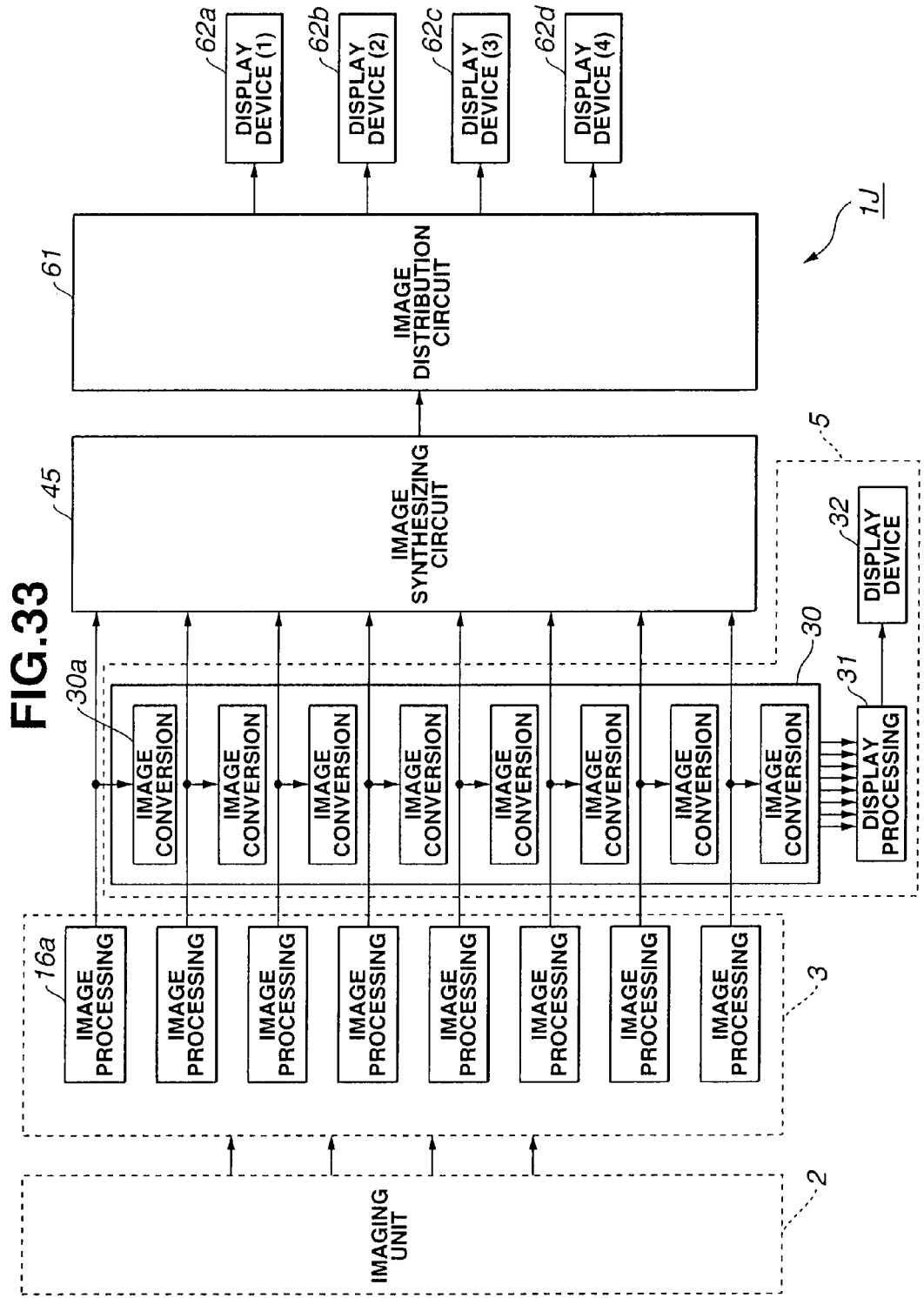

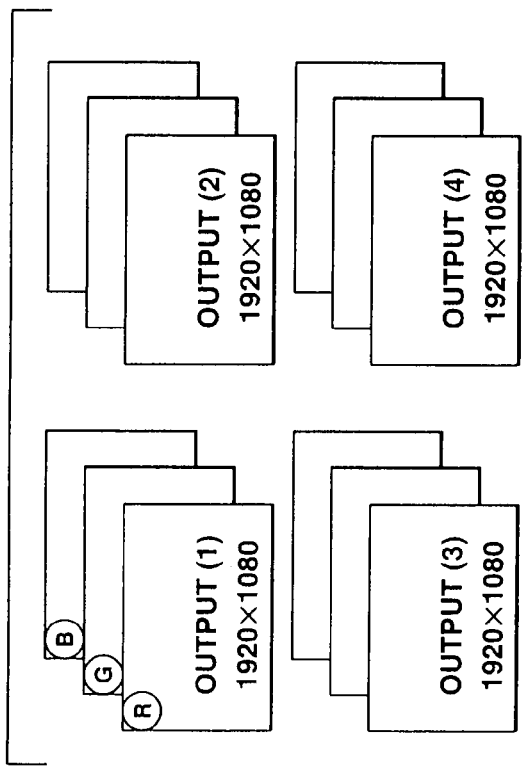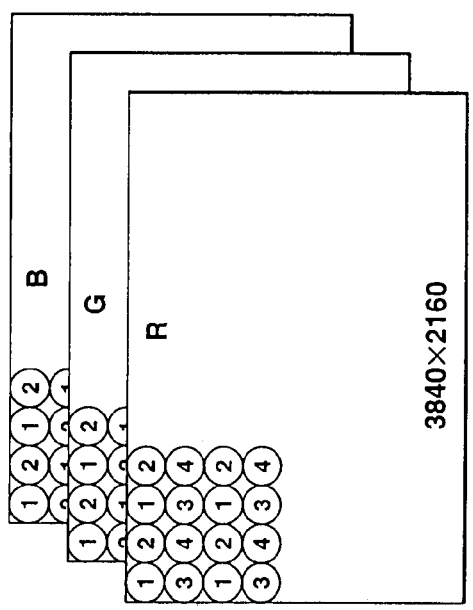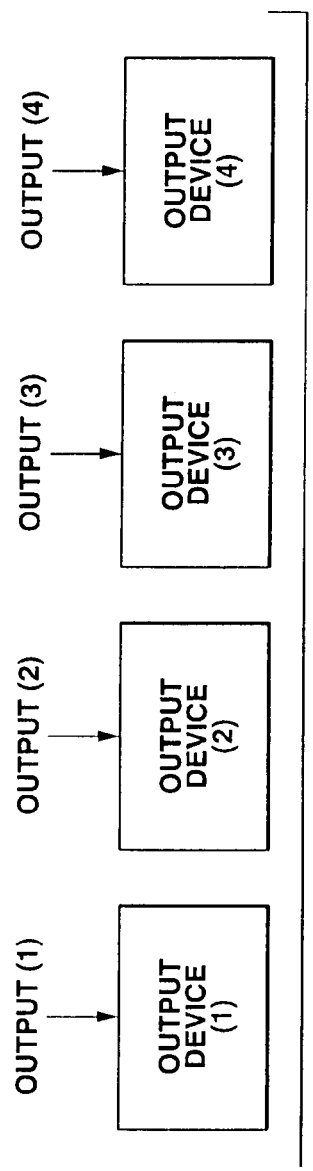

IMAGE PROCESSING DEVICE

CROSS-REFERENCE TO RELATED APPLICATION

The present application is a divisional application of previously filed U.S. patent application Ser. No. 10/077,445 filed on Feb. 15, 2002 now U.S. Pat. No. 7,176,966, which is based upon and claims the benefit of priority of Japanese Patent Application No. 2001-040500 filed in Japan on Feb. 16, 2001. The contents of these applications are incorporated by this reference.

BACKGROUND OF THE INVENTION

1. Field of the Invention

The present invention relates to an image processing device for obtaining high-definition images by means of a plurality of image-pickup elements used in a TV camera or the like.

2. Description of the Related Art

Conventionally, devices such as electronic cameras and the like have been known which mount image-pickup devices that contain image-pickup elements. Furthermore, as high-definition image formation has progressed in display devices, printers and the like, a demand has arisen for image-pickup devices that can acquire high-definition images with better image quality. Accordingly, for example, an image-pickup device which acquires high-definition images by using a plurality of image-pickup elements is disclosed in Japanese Unexamined Patent Application Publication No. 60-154781.

However, the processing of high-definition images obtained by such image-pickup means at a moving image rate is difficult to realize at the processing speed of current image processing devices.

Furthermore, as is indicated in Japanese Unexamined Patent Application Publication No. 60-154781, image-pickup means for obtaining high-definition images using a plurality of image-pickup elements are already known. However, the recording of high-definition images obtained by such image-pickup means is difficult to realize at the recording speed of current recording devices.

OBJECTS AND SUMMARY OF THE INVENTION

Objects of the present invention are to provide an image processing device and image processing method which makes it possible to process the high definition image at a moving image rate with a high speed.

In short, the abovementioned image processing device for obtaining images using a plurality of image-pickup elements comprises the following:

image-pickup signal processing circuits installed for each image-pickup element;

an image arrangement conversion circuit which converts the read-out order of the signals output from the abovementioned image-pickup signal processing circuits;

an image splitting processing circuit which splits the images into respective regions;

an image processing circuit into which the split images are respectively input; and an image compression circuit which compresses the images output from the abovementioned image processing circuit.

These objects and advantages of the present invention will be more clearly understand from the following detailed explanation.

BRIEF DESCRIPTION OF THE DRAWINGS

FIG. 2 is a diagram which illustrates the configuration of the color separation prism and four image-pickup element parts in the image-pickup unit of the first embodiment;

FIG. 3A is an explanatory diagram of the arrangement of the four image-pickup elements in the image-forming positions and the like in the first embodiment;

FIG. 3B is a partial enlarged view of the image-pickup elements shown in FIG. 3A in the first embodiment;

FIG. 7 shows details of reading from the memory in the first embodiment;

FIG. 8A is an explanatory diagram of the operation performed by the image processing circuit in the first embodiment;

FIG. 8B is an explanatory diagram of the operation performed by the image processing circuit in the first embodiment;

FIG. 8C is an explanatory diagram of the operation performed by the image processing circuit in the first embodiment;

FIG. 8D is an explanatory diagram of the operation performed by the image processing circuit in the first embodiment;

FIG. 9 is a block diagram which illustrates the configuration of the image processing device in a second embodiment of the present invention;

FIG. 19 is a block diagram which illustrates the configuration of the image processing device of a first modification of the second embodiment;

FIG. 22A is an explanatory diagram of the function of the image synthesizing circuit in the third embodiment;

FIG. 22B is an explanatory diagram of the function of the image synthesizing circuit in the third embodiment;

FIG. 22C is an explanatory diagram of the function of the image synthesizing circuit in the third embodiment;

FIG. 22D is an explanatory diagram of the function of the image synthesizing circuit in the third embodiment;

FIG. 24 is a block diagram which illustrates the configuration of the image processing device of a second modification of the third embodiment;

FIG. 25A is a diagram which illustrates image splitting in a fourth embodiment of the present invention;

FIG. 25B is a diagram which illustrates image splitting in the fourth embodiment of the present invention;

FIG. 25C is an explanatory diagram which shows how image splitting is performed with the images overlapped in the fourth embodiment of the present invention;

FIG. 26 is an explanatory diagram of writing operation into the FIFO memory constituting a part of the image splitting circuit in the fourth embodiment;

FIG. 27 is an explanatory diagram which shows how pixels in portions that are overlapped near the ends in the split image region are utilized in image processing in the fourth embodiment;

FIG. 31 is a block diagram which illustrates the overall configuration of the image processing device of a sixth embodiment of the present invention;

FIG. 32A is an explanatory diagram of the operation performed by the shading correction circuit in the sixth embodiment;

FIG. 32B is an explanatory diagram of the operation performed by the shading correction circuit in the sixth embodiment;

FIG. 32C is an explanatory diagram of the operation performed by the shading correction circuit in the sixth embodiment;

FIG. 32D is an explanatory diagram of the operation performed by the shading correction circuit in the sixth embodiment;

FIG. 32E is an explanatory diagram of the operation performed by the shading correction circuit in the sixth embodiment;

FIG. 33 is a block diagram which illustrates the overall configuration of the image processing device of a seventh embodiment of the present invention;

FIG. 35A is a diagram which illustrates the function of the image distribution circuit in a modification of the image processing device of the seventh embodiment;

FIG. 35B is a diagram which illustrates the function of the image distribution circuit in a modification of the image processing device of the seventh embodiment; and FIG. 35C is a diagram which illustrates the function of the image distribution circuit in a modification of the image processing device of the seventh embodiment.

DETAILED DESCRIPTION OF THE PREFERRED EMBODIMENTS

Embodiments of the present invention will be described below with reference to the attached figures.

Figure 1:
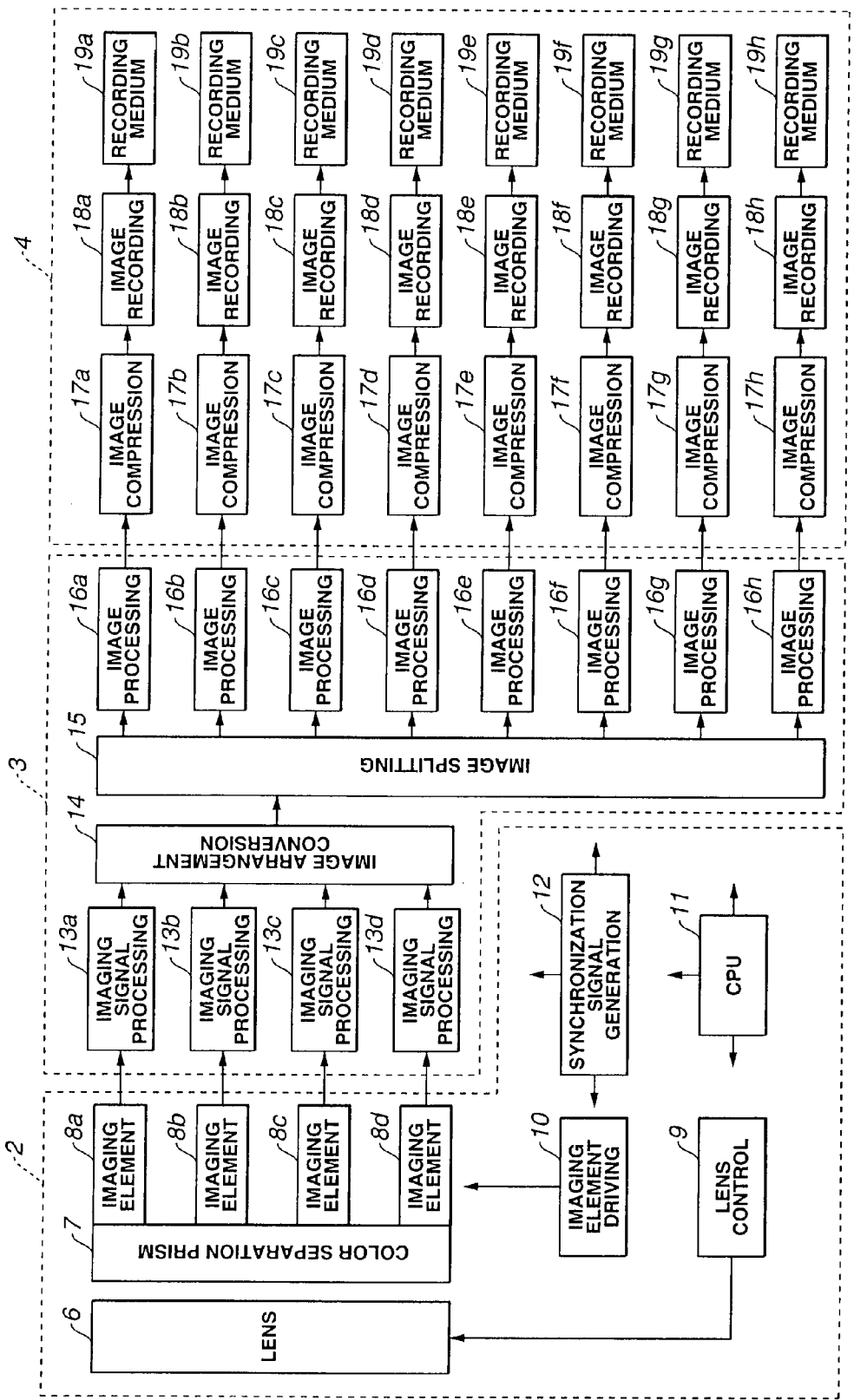
FIG. 1 is an overall structural diagram of the image processing device of a first embodiment of the present invention.

An image processing device 1A shown in FIG. 1 has an image-pickup unit 2 which performs image-pickup, a signal processing part 3 which performs signal processing on the signals produced by image-pickup, and a recording part 4 which records the images produced by the signal processing performed by the signal processing part 3.

The image-pickup unit 2 has a lens 6 which forms an optical image of the subject, a color separation prism 7 which subjects the light incident on the abovementioned lens 6 to color separation, four (for example) image-pickup elements 8a, 8b, 8c and 8d on which optical images are formed via the abovementioned color separation prism 7, a lens control circuit 9 which controls the lens 6 into a focused state and the like, an image-pickup element driving circuit 10 which drives the image-pickup elements 8a, 8b, 8c and 8d, a CPU 11 which controls the lens control circuit 9 and the like, and a synchronization signal generating circuit 12 which supplies a basic clock signal and horizontal and vertical synchronization signals to the image-pickup element driving circuit 10 and the like.

Furthermore, the signal processing part 3 has image-pickup signal processing circuits 13a through 13d which perform processing that converts the output signals of the image-pickup elements 8a through 8d into digital signals, an image arrangement conversion circuit 14 that performs image sequencing from the output signals of the abovementioned image-pickup signal processing circuits 13a through 13d, an image splitting circuit 15 which splits the output signal of the abovementioned image arrangement conversion circuit 14 into (for example) eight image regions, and image processing circuits 16a through 16h which perform processing that produces RGB color signals for the signals of the eight image regions produced by the splitting performed by the image splitting circuit 15.

Furthermore, the recording part 4 has image compression circuits 17a through 17h that perform image compression processing on the output signals of the image processing circuits 16a through 16h, image recording circuits 18a through 18h that perform recording processing on the output signals of the image compression circuits 17a through 17h, and recording media 19a through 19h that record the output signals of the image recording circuits 18a through 18h. Moreover, in FIG. 1, the image compression circuits 17a through 17h are included in the recording part 4; however, it would also be possible to include these circuits in the signal processing part 3.

FIG. 2 shows the configuration of the color separation prism 7 and four image-pickup element parts. The light passing through the lens 6 (i. e., the light reflected from the subject) is split by blue (B), G1 (green), G2 (green) and red (R) prisms 7a, 7b, 7c and 7d, and these split light beams are respectively formed as images on the image-pickup elements 8a, 8b, 8c and 8d.

Furthermore, as is shown in FIG. 3A, the abovementioned image-pickup elements 8a through 8d are joined to the prisms 7a, 7b, 7c and 7d in positions that are shifted by ½ of one pixel to the up-down directions and left-right directions with respect to the image that is formed in common. Moreover, a function that is equivalent to that of an image-pickup element that has four times the pixels of a single image-pickup element is achieved by means of the four image-pickup elements 8a through 8d.

Figure 4:
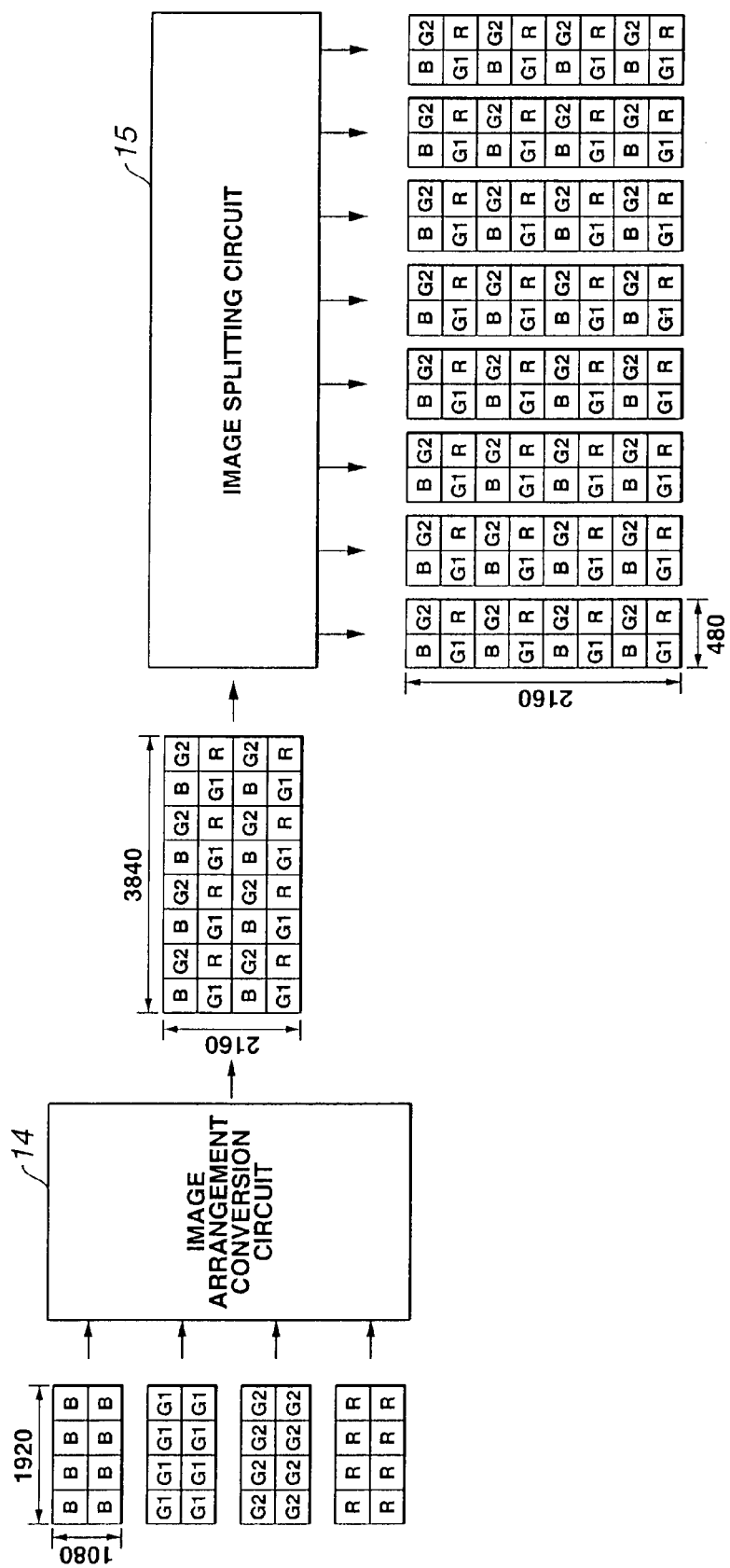
FIG. 4 is a model explanatory diagram of the functions of the image arrangement conversion circuit and image splitting circuit in the first embodiment.

In the present embodiment, image-pickup elements that have (for example) 2,000,000 pixels are respectively used as the image-pickup elements 8a through 8d; accordingly, an overall resolution of 8,000,000 pixels is obtained. As is shown in FIG. 4, image-pickup elements that have 1920 pixels in the horizontal direction and 1080 pixels in the vertical direction (in this case, an aspect of 16:9) are used.

A partial enlarged view of FIG. 3A is shown in FIG. 3B.

The pixel in the upper left corner is a pixel of the image-pickup element 8a; the pixels below this pixel and to the right of this pixel are pixels of the image-pickup elements 8b and 8c, and the pixel to the right of the pixel of the image-pickup element 8b is a pixel of the image-pickup element 8d. These four pixels are arranged in a repeating pixel arrangement in the lateral direction (horizontal direction) and longitudinal direction (vertical direction). Furthermore, in order to simplify the description, in FIG. 3B, these pixels are indicated by the symbols a through d (except for eight parts) in the image-pickup elements 8a through 8d.

As is shown in FIG. 1, the image-pickup element driving circuit 10 receives a signal from the synchronization signal generating circuit 12 and generates a driving signal, and this driving signal is applied in common to the four image-pickup elements 8a through 8d. As a result, the four image-pickup elements 8a through 8d are driven in parallel, and the output signals of these image-pickup elements are respectively input into the four image-pickup signal processing circuits 13a through 13d.

The image-pickup signal processing circuits 13a through 13d process in parallel the analog signals that are simultaneously output in parallel from the image-pickup elements 8a through 8d and converts into digital signals. Then, these signals are output to the image arrangement conversion circuit 14, which converts the image arrangement.

In the present embodiment, as was described above, the four plate-type image-pickup elements 8a through 8d are driven at the same timing by a common driving signal; accordingly, the following merits are obtained: namely, the configuration of the driving system can be simplified, and the image-pickup signal processing circuits 13a through 13d can process the output signals in common, so that these circuits can also be simplified.

In the abovementioned image arrangement conversion circuit 14, the image signals of respective colors that are simultaneously output from the image-pickup signal processing circuits 13a through 13d are subjected to an arrangement conversion so that an image signal with a Bayer arrangement is produced.

Specifically, as is shown in model form in FIG. 4, image signals B, G1, G2 and R output from the image-pickup elements 8a through 8d (and processed by image signal processing circuits 13a through 13d) are input into the image arrangement conversion circuit 14. In this case, the respective image signals are image signals of 1920 pixels in the horizontal direction and 1080 pixels in the vertical direction; an arrangement conversion is performed by the image arrangement conversion circuit 14 so that an image signal with a Bayer arrangement of 3840 pixels in the horizontal direction and 2160 pixels in the vertical direction is produced.

The output signal of this image arrangement conversion circuit 14 is input into the image splitting circuit 15, and this image splitting circuit 15 splits the abovementioned output signal into images (signals) in a plurality of regions, i.e., eight images (signals) in concrete terms, so that processing can be performed in real time on the post-stage side.

As abovementioned, the image signal with a Bayer arrangement produced by the image arrangement conversion circuit 14 is split into eight regions in the horizontal direction by the image splitting circuit 15. Specifically, the image signal with a Bayer arrangement is not split in the vertical direction, but is split into eight equal regions in the horizontal direction (as will be described below, the image arrangement conversion and image splitting are actually performed in parallel).

Figure 5:
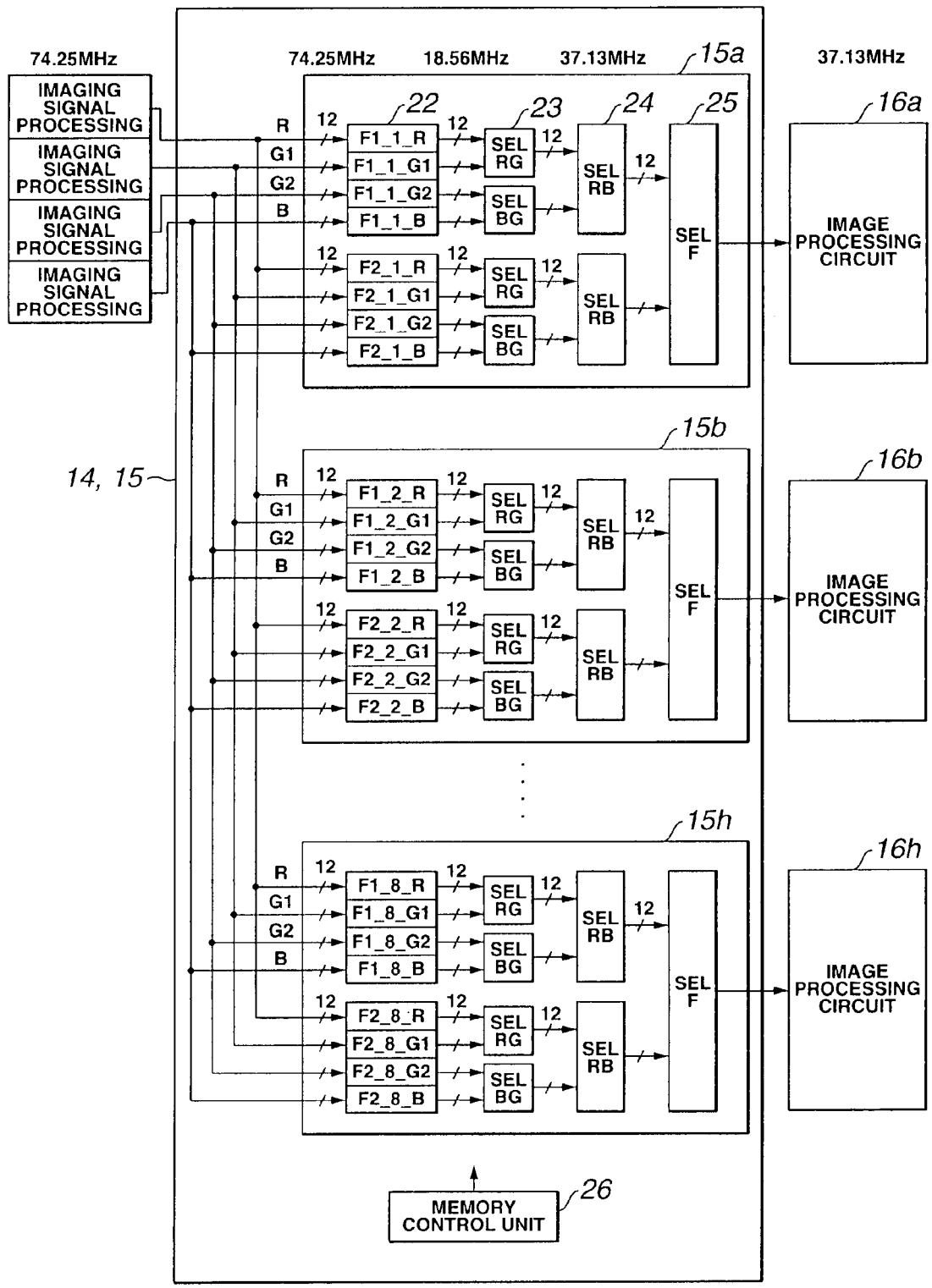
FIG. 5 is a diagram which illustrates the configuration of the image arrangement conversion circuit and image splitting circuit in the first embodiment.

FIG. 5 shows the concrete configurations of the image arrangement conversion circuit 14 and image splitting circuit 15.

The R, G1, G2 and B image signals that are respectively output from the image-pickup signal processing circuits 13d, 13b, 13c and 13a at 74.25 MHz are input via wiring lines into eight image splitting constituent circuits (hereafter referred to as "image splitting circuits" for the sake of simplification) 15a through 15h.

Furthermore, the image arrangement conversion circuit 14 is actually constituted to adjust the timing at which the image signals are input into the image splitting circuits 15a through 15h. Specifically, the image signal formed by combining the R, G1, G2 and B image signals that are input into the image splitting circuits 15a through 15h is an image signal with a Bayer arrangement of 3840 pixels in the horizontal direction and 2160 pixels in the vertical direction, as shown in FIG. 4, and image arrangement conversion and image splitting are actually performed in parallel.

For example, the image splitting circuit 15a is constructed from two sets of four FIFO memories, i.e., eight FIFO memories 22, four first selectors 23 (two sets SEL RG and SEL BG in FIG. 5), two second selectors 24 (two sets SEL RB in FIG. 5), and a third selector 25 (SEL F in FIG. 5). The output signal of the third selector 25 is input into the image processing circuit 16a. The other image splitting circuits 15b through 15h also have a similar configuration.

Writing into the FIFO memories 22 and reading from the FIFO memories 22 are performed under the control of a memory control unit 26. In this case, in all of the FIFO memories 22 installed in the image splitting circuits 15a through 15h, writing is performed in units of four memories. In other words, all of the FIFO memories 22 are constructed in units of four, from F1_1 to F1_8, and from F2_1 to F2_8. Here, for example, F1_1 has F1_1_R, F1_1_G1, F1_1_G2 and F1_1_B that are used for the simultaneous writing of the four images (signals) R, G1, G2 and B, respectively. The other FIFO memories are similar.

Figure 6:
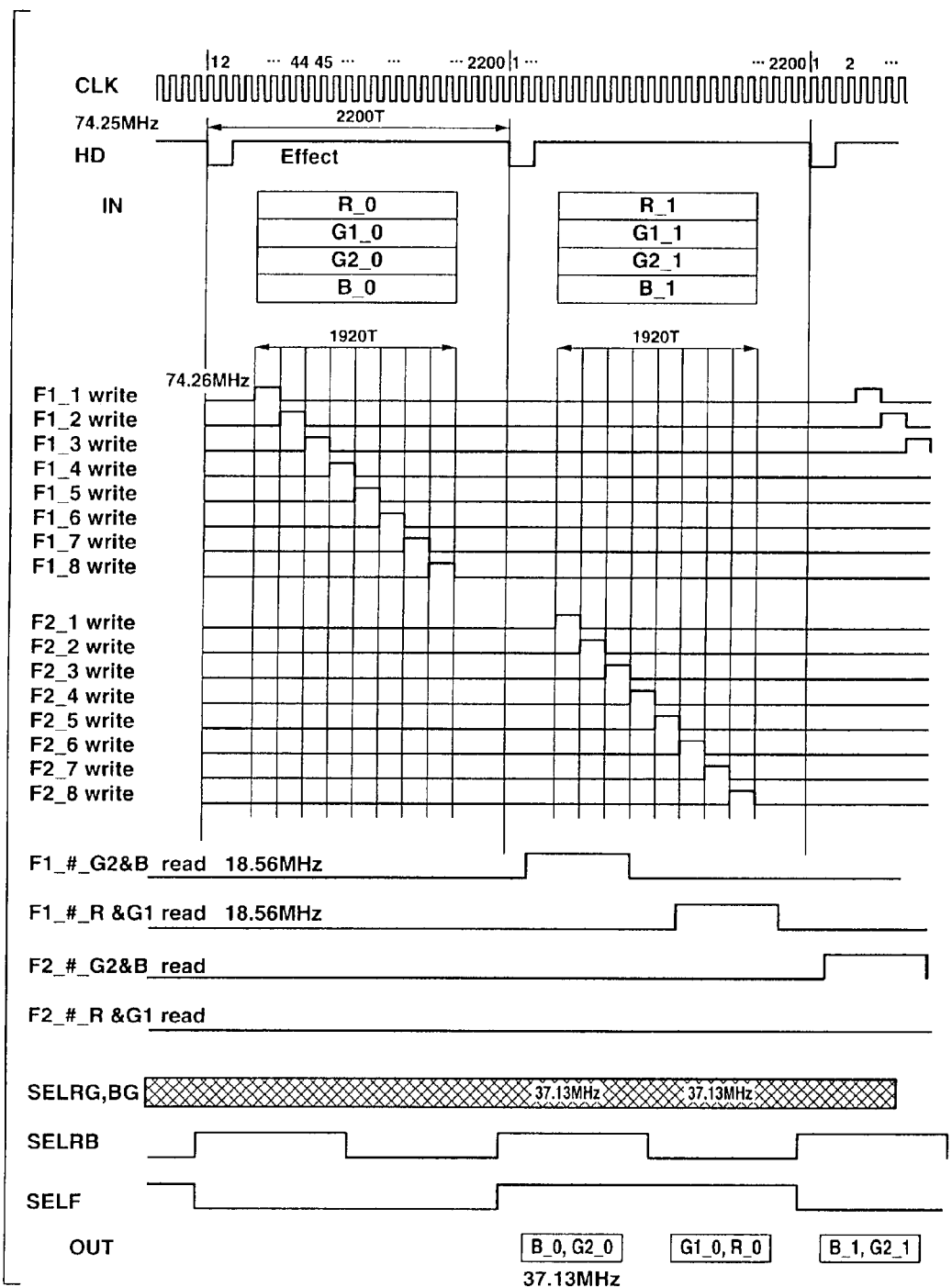
FIG. 6 is a timing chart for the writing and reading of data into and from the FIFO memory constituting a part of the image splitting circuit in the first embodiment.

FIG. 6 shows a detailed timing chart of the writing into the FIFO memories 22 and reading from the FIFO memories 22.

As is shown in FIG. 6, signals of R, G1, G2 and B are input into the FIFO memories 22 simultaneously (in parallel) from the image-pickup signal processing circuits 13d, 13b, 13c and 13a in synchronization with the horizontal synchronizing signal by a clock of 74.25 MHz. Furthermore, if the period of the 74.25 MHz clock is designated as T, then one horizontal period is 2200T, and of this period, 1920T is the signal input period of the effective pixels.

In FIG. 6, the signals of R, G1, G2 and B that are input in the initial horizontal period are indicated by R_0, G1_0, G2_0 and B_0, and the signals that are input in the next horizontal period are indicated by R_1, G1_1, G2_1 and B_1.

Next, the FIFO memories 22 from F1_1 to F1_8 are successively set in a writing state by a write clock at 74.25 MHz, so that the effective pixel period 1920T is split into eight parts, and signals consisting of 240 pixels each are successively stored in memory.

In the next horizontal period, the FIFO memories 22 from F2_1 to F2_8 are successively set in a writing state, and signals consisting of 240 pixels each are successively stored in memory in a similar manner.

Furthermore, while writing is being performed into the FIFO memories 22 from F2_1 through F2_8, the memories F1_1_G2 and F1_1_B, and F1_1_R and F1_1_G1, are successively read by a read clock at 18.56 MHz, which is ¼ of 74.25 MHz.

Then, the output from each FIFO memory of F1_1_G2 and F1_1_B is switched to 37.13 MHz, which is twice 18.56 MHz, by the first selector 23 (in concrete terms, SEL BG), then the outputs are input into the second selector 24 (in concrete terms, SEL RB).

Furthermore, the output from each FIFO memory of F1_1_R and F1_1_G1 is also switched to 37.13 MHZ by the first selector 23 (in concrete terms, SEL RG), then the outputs are input into the second selector 24 (in concrete terms, SEL RB).

Furthermore, being switched by the second selector 24 (in concrete terms, SEL RB) and the third selector 25 (in concrete terms, SEL F) as shown in FIG. 6, the signals B_0 and G2_0 read out from F1_1_G2 and F1_1_B are output at 37.13 MHz and input into the image processing circuit 16i (i=a to h). Similarly, the signals G1_0 and R_0 read out from F1_1_R and F1_1_G1 are output at 37.13 MHZ and input into the image processing circuit 16i.

In the next horizontal period, the FIFO memories 22 from F1_1 to F1_8 are successively set in a writing state, so that signals of 240 pixels each are successively stored in memory. During this period, the FIFO memories 22 from F2_1 to F2_8 are in a read-out state. Then, the signals B_1 and G2_1, and the signals G1_1 and R_1, are successively output.

FIG. 7 shows a detailed timing chart of this memory read-out.

F1_1_G2 and F1_1_B are read out in parallel (simultaneously) in 240-pixel increments by the read clock. In FIG. 7, it is shown that B1, 2, . . . , 240 are output from F1_1_B, and that G2 1, 2, . . . , 240 are output from F1_1_G2.

Afterward, F1_1_R and F1_1_G1 are read out in 240-pixel increments by the read clock.

Then, by switching SEL BG at twice the speed of the read clock, B and G2 output in parallel are alternately output at twice the speed. In other words, a signal of 480 pixels in which B and G2 are repeated is output.

Furthermore, as a result of the similar switching of SEL RG, R and G1 are alternately output in parallel at twice the speed. In other words, a signal of 480 pixels in which R and G1 are repeated is output.

This output signal of SEL BG is output via SEL RB and SEL F, and the output signal of SEL RG is output via SEL RB and SEL F.

Thus, a signal of 480 pixels in which B and G2 are repeated and a signal of 480 pixels in which R and G1 are repeated are output in the horizontal direction. In other words, a signal with a Bayer arrangement such as that shown in FIG. 4 is obtained.

The signal processing circuits 16i performs processing which produces RGB signals for the respective pixels. Namely, each of the abovementioned pixels has only a single color signal component, and lacks the other two color signal components; accordingly, the lacking color signals are produced by the image processing circuit 16i using the signals of the surrounding pixels.

FIGS. 8A through 8D show explanatory diagrams of the operations performed by the respective image processing circuits.

FIG. 8A shows pixels in a Bayer arrangement that are input into one of the image processing circuits 16i; signals of pixels that have RGB components are produced from the pixels of this arrangement as shown in FIGS. 8B, 8C and 8D. In FIG. 8A, for example, an R pixel is designated as the center, and adjacent R signals are produced using the surrounding 5×5 pixels.

The signal that is thus subjected to image processing by the image processing circuit 16i (i=a to h) is input into the image compression circuit 17i (i=a to h) and compressed by a compression method such as JPEG, MPEG or the like, so that the signal is converted into a signal that can be recorded on the recording medium 19i by the image recording circuit 18i. Then, each signal is respectively recorded on a non-volatile, large-capacity recording medium 19i (i=a to h) such as a hard disk or the like.

In the present embodiment, as was described above, high-definition images with large numbers of pixels are split into a plurality of image regions, and color signal production processing and the like are respectively performed on the split images; accordingly, even high-definition images can be subjected to high-speed processing at a moving image rate.

Furthermore, in the recording part 4 as well, image compression and image recording processing are performed on the split images produced by the abovementioned splitting, so that processing at a moving image rate is possible even in the case of high-definition images that cannot be processed at a moving image rate in cases where these images are not split.

In other words, the processing speed in the respective split images can be reduced as a result of the images being split into a plurality of images and processed in parallel. Accordingly, even low-speed circuit elements and the like can be used, so that the cost of the operation can also be lowered.

Furthermore, since a plurality of recording media 19a through 19h are also used, the present invention also has the effect of allowing recording at a moving image rate even in the case of compressed data of high-definition images that would exceed the recording rate that is possible in the case of a single recording medium.

Furthermore, by making the pixel arrangements of the split images all the same in cases where the images are split into a plurality of regions, it is possible to use the images in elements that have the same configuration in each split image process, and the configuration and control used in the case of synchronized parallel processing can be simplified. Accordingly, a reduction in cost is also possible.

Next, a second embodiment of the present invention will be described.

The image processing device 1B of the second embodiment shown in FIG. 9 has a configuration in which a display part 5 is further installed in the image processing device 1A shown in FIG. 1.

Specifically, the output signals of the image processing circuits 16i are input into the image conversion circuits 30i (i=a to h) of an image conversion circuit part 30 that forms a portion of the display part 5. Then, after being converted into images consisting of desired numbers of pixels by the image conversion circuits 30i, these signals are input into a display processing circuit 31, and signal processing which allows display by a display device 32 is performed, so that the signals can be displayed by this display device 32.

Furthermore, in this second embodiment, the lens 6 is constructed from a zoom lens, and the device is arranged so that the zoom magnification can be altered by operating zoom magnification altering means 20. This signal of the zoom magnification altering means 20 is input into the CPU 11, and a control action is performed which alters the zoom magnification in accordance with the abovementioned operation.

Furthermore, a display switch SW34 which performs display switching is provided; the switching instruction signals of this switch are input into the CPU 11, and the CPU 11 performs a control action in accordance with these switching instruction signals. Specifically, as will be described below, the display of (for example) thinned images as reduced images, or the display of partial image portions (in the overall image), i. e., the display of partial images, can be selected by means of the display switch SW34.

Figure 10:
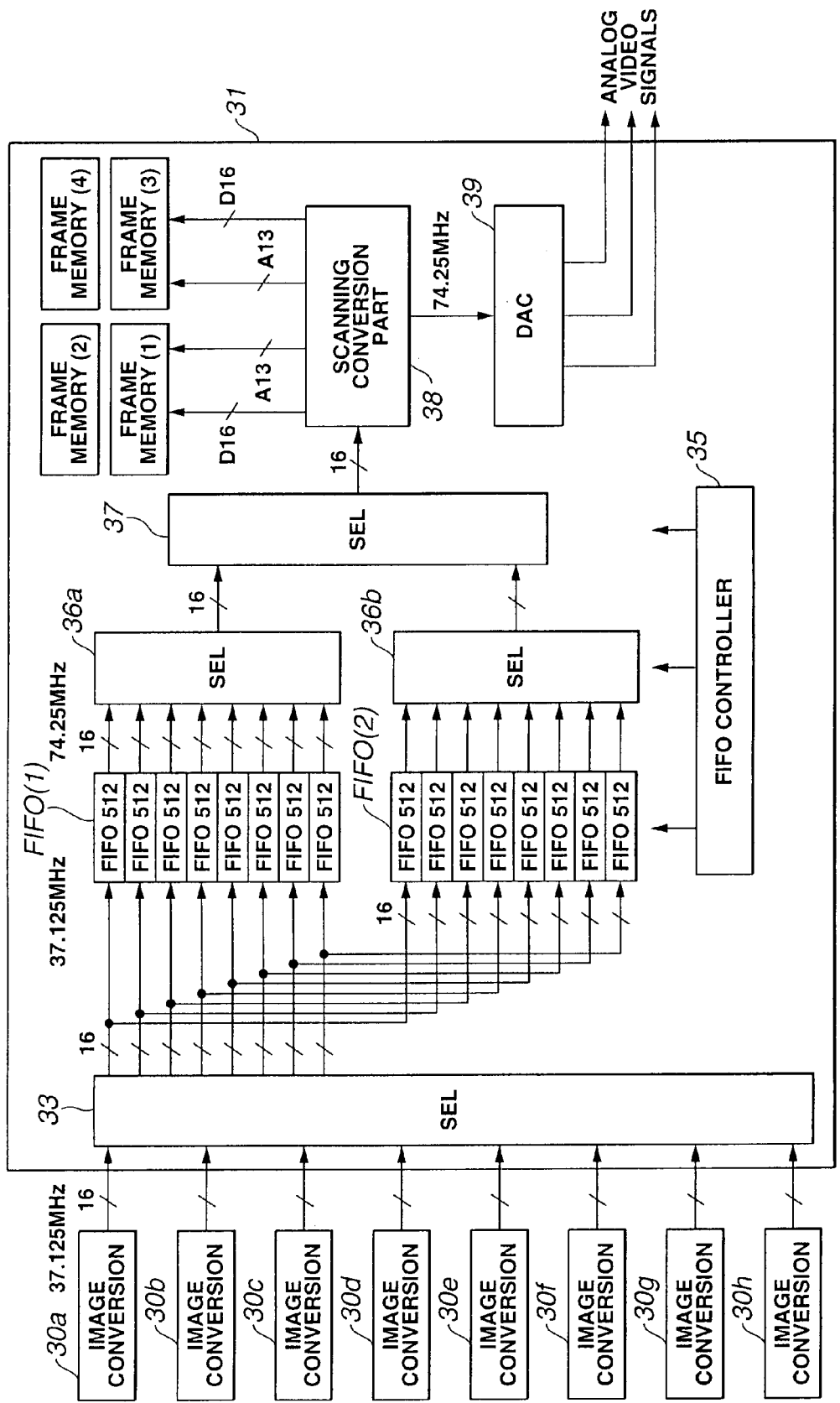
FIG. 10 is a block diagram which shows the detailed configuration of the display processing circuit in the second embodiment.

FIG. 10 illustrates the configuration of the display processing circuit 31.

The output signals from the image conversion circuits 30a through 30h are input into two sets of eight FIFO memories each, i.e., FIFO memories (1) and FIFO memories (2) via a selector 33. Writing and reading into and from the two sets of the FIFO memories (1) and (2) are controlled by an FIFO controller 35. The signals read out from the two sets of the FIFO memories (1) and (2) pass through selectors 36a and 36b, and are further output from a common selector 37.

The output of this selector 37 passes through a scanning conversion part 38, and is temporarily stored in four frame memories (1) through (4). Here, two frame memories are used in the case of thinning, and the frame memories (1) through (4) are used in the case of partial display. Furthermore, the signals are read out at a specified timing; these signals pass through the scanning conversion part 38 and are converted into analog video signals by a DAC 39, after which the analog video signals are output to the display device 32.

Figure 11:
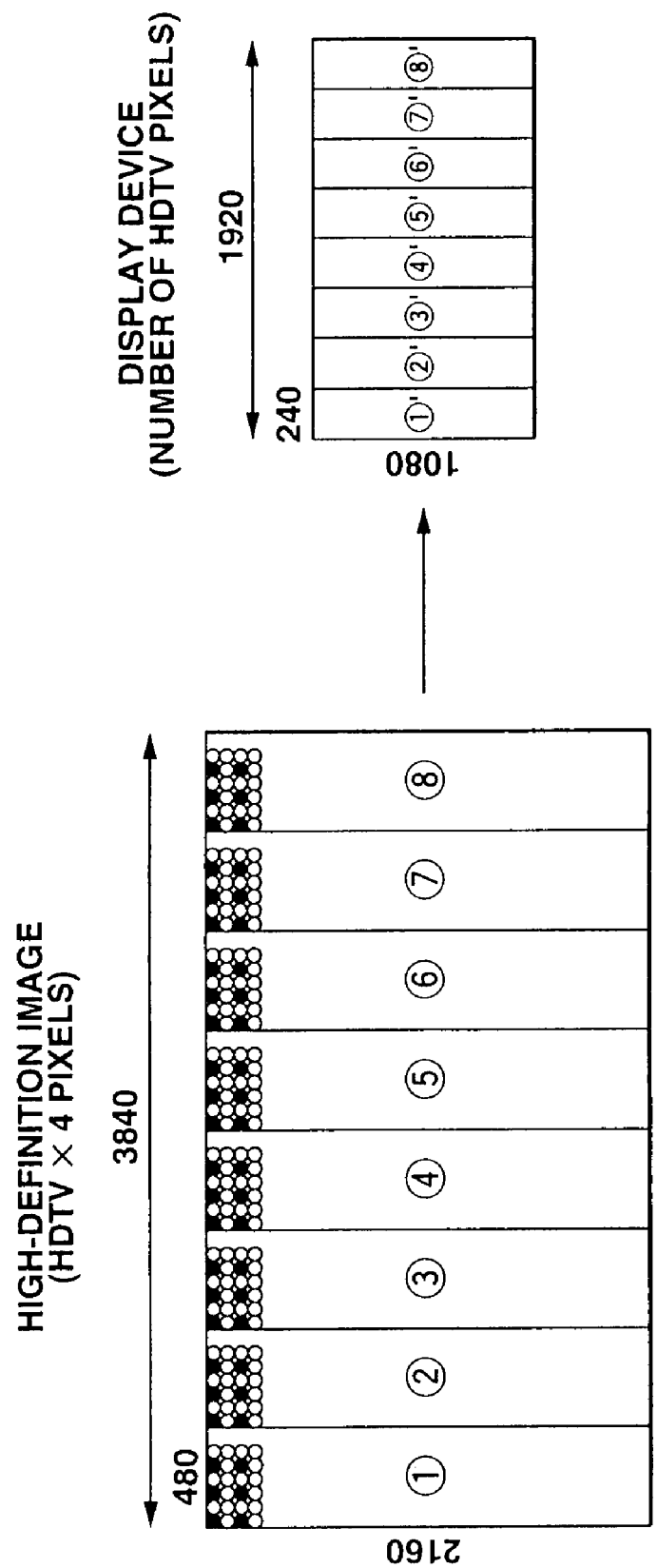
FIG. 11A is an explanatory diagram of the function that performs thinning from the high-definition image and displays a thinned image in the second embodiment.
FIG. 11B is an explanatory diagram of the function that performs thinning from the high-definition image and displays a thinned image in the second embodiment.

FIGS. 11A and 11B are diagrams which show the operation performed in the case of a thinned image display when instructions for the display of a reduced image (in concrete terms, the display of a thinned image which is displayed with pixels thinned out in the horizontal and vertical directions) are given by means of the display switch SW34.

The eight images indicated by the symbols ①  through ⑧ in FIG. 11A, each consisting of 480 pixels in the horizontal direction and 2160 pixels in the vertical direction, are thinned out in both directions so that these images are converted into eight images consisting of ½ the original numbers of pixels in the horizontal and vertical directions, i. e., 240 pixels in the horizontal direction and 1080 pixels in the vertical direction, thus converting the overall image into an image consisting of 1920 pixels in the horizontal direction and 1080 pixels in the vertical direction, which is displayed by the high-vision display device 32 (see FIG. 11B).

Figure 12:
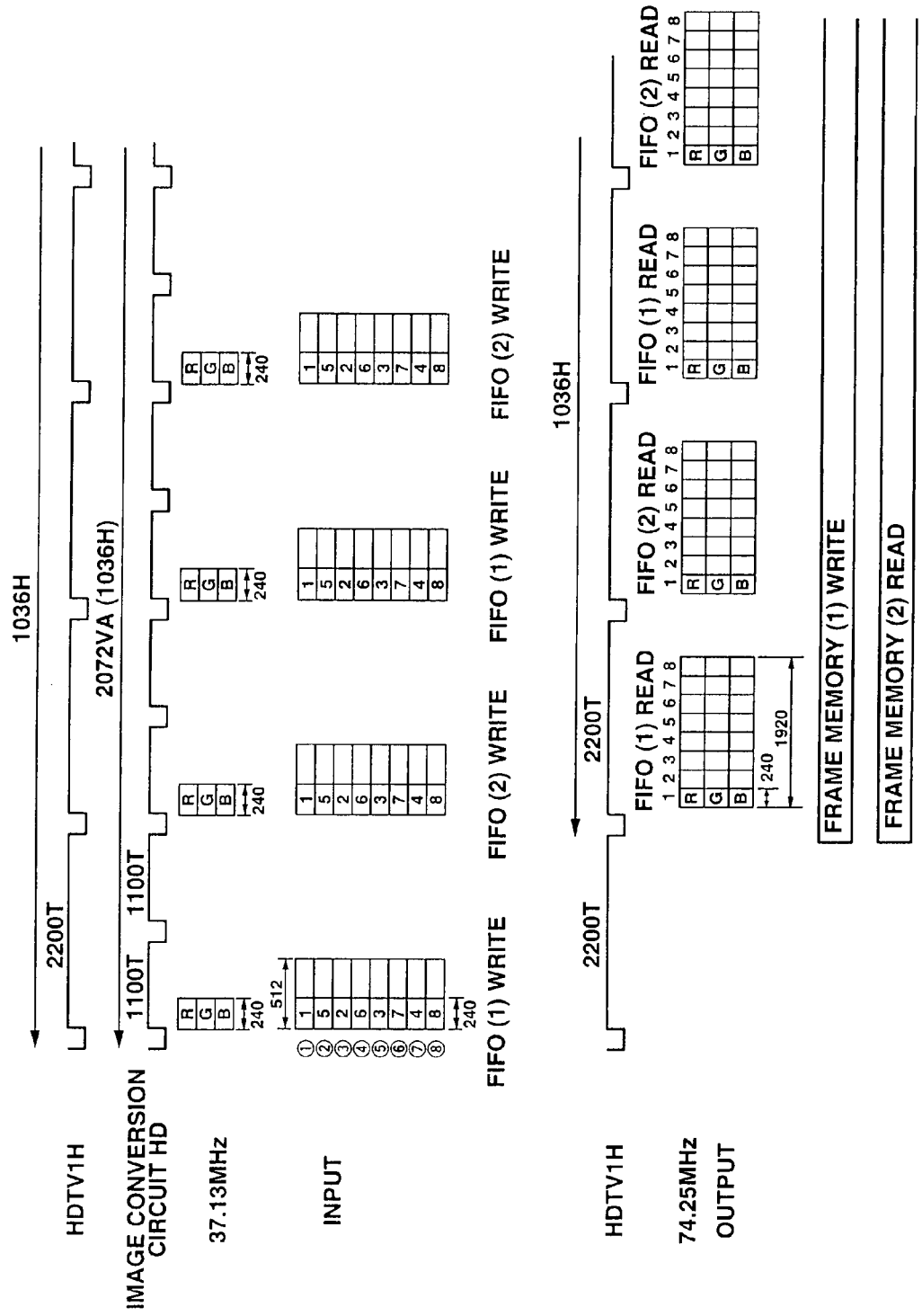
FIG. 12 is an explanatory operating diagram of the function that performs thinning from the high-definition image and displays a thinned image in the second embodiment.

As is shown in FIG. 12, the horizontal periods (1100T) of the image conversion circuits 30a through 30h are ½ the horizontal period (2200T) in the high-vision television (HDTV).

Furthermore, in the period (1100T) corresponding to the first half of the horizontal period (2200T) of the HDTV, the RGB signals output from the image conversion circuits 30a through 30h are written into the FIFO memories (1) while being thinned (these signals are simultaneously written into the memories indicated by 1 through 8 in FIG. 12). In the latter half-period (1100T), writing is not performed, and the image is thinned by one line. In the next first half-period, writing is similarly performed into the other FIFO memories (2), and in the subsequent latter half-period, writing is not performed, so that the image is thinned by one line.

Thus, thinned images which are thinned by ½ in the horizontal direction and vertical direction are stored in the respective FIFO memories (1) and (2) by alternately writing into the FIFO memories (1) and (2) in the first half-period of each horizontal period of the high-vision television.

Furthermore, the FIFO memories (1) are read in the order of the constituent elements of these memories indicated by 1 through 8 at a clock that is twice the speed at which writing was performed in the horizontal period of writing into the FIFO memories (2). The read-out signals are temporarily stored in the frame memory (1), and during the period of the next frame, the written images are read out and displayed by the display device 32 of the high-vision television.

Meanwhile, in the frame period of writing into the frame memory (1), signals are read out from the frame memory (2) into which signals were written in the previous frame, and these signals are displayed by the display device 32 of the high-vision television.

Figure 13:
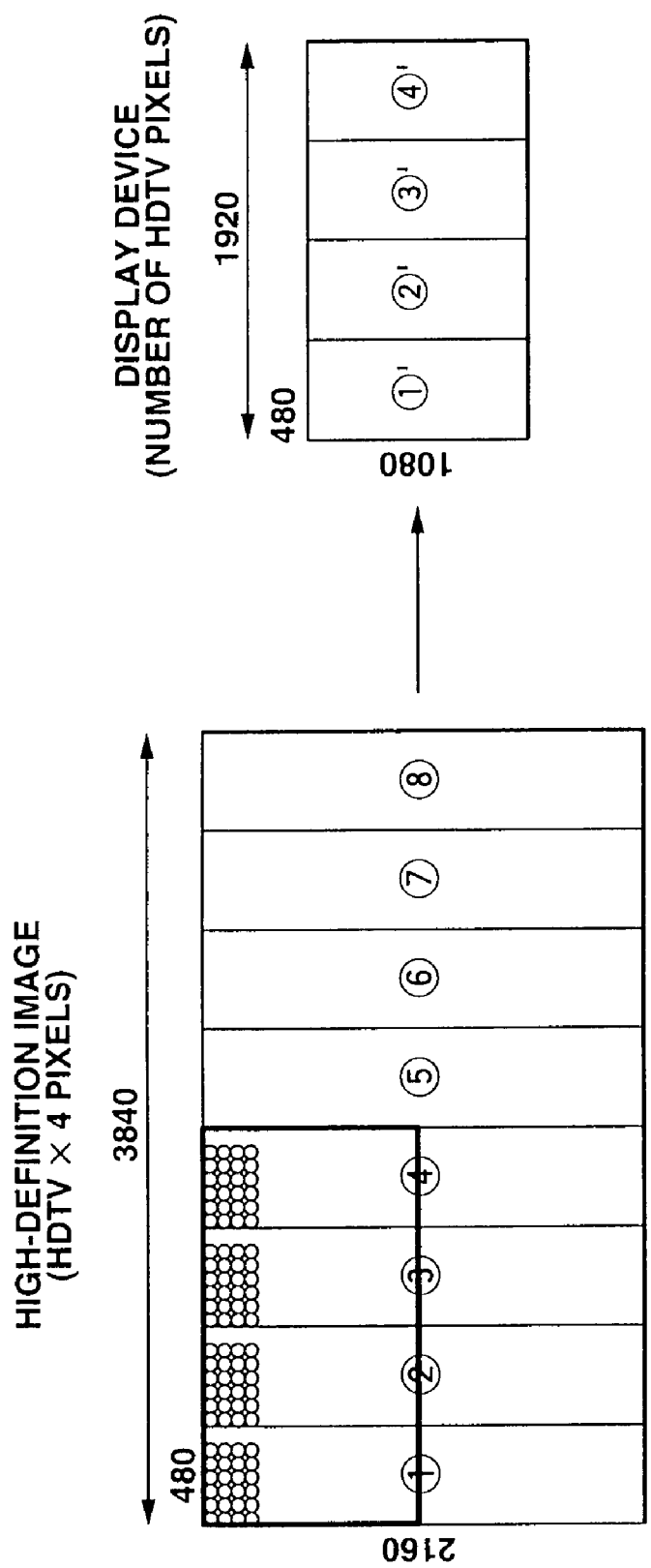
FIG. 13A is an explanatory diagram of the function of partial image display in the second embodiment.
FIG. 13B is an explanatory diagram of the function of partial image display in the second embodiment.

FIGS. 13A and 13B show an image of the partial image display in a case where instructions are given for a partial image display.

In the eight images indicated by the symbols ① through ⑧ in FIG. 13A, each consisting of 480 pixels in the horizontal direction and 2160 pixels in the vertical direction, the left corner portion enclosed with a thick line extending from the symbols ① to ④ is cut out, and is converted into four images that each have 1080 pixels in the vertical direction; the overall image is thus converted into an image with 1920 pixels in the horizontal direction and 1080 pixels in the vertical direction, and this image is displayed by the display device of the high-vision television (see FIG. 13B).

Figure 14:
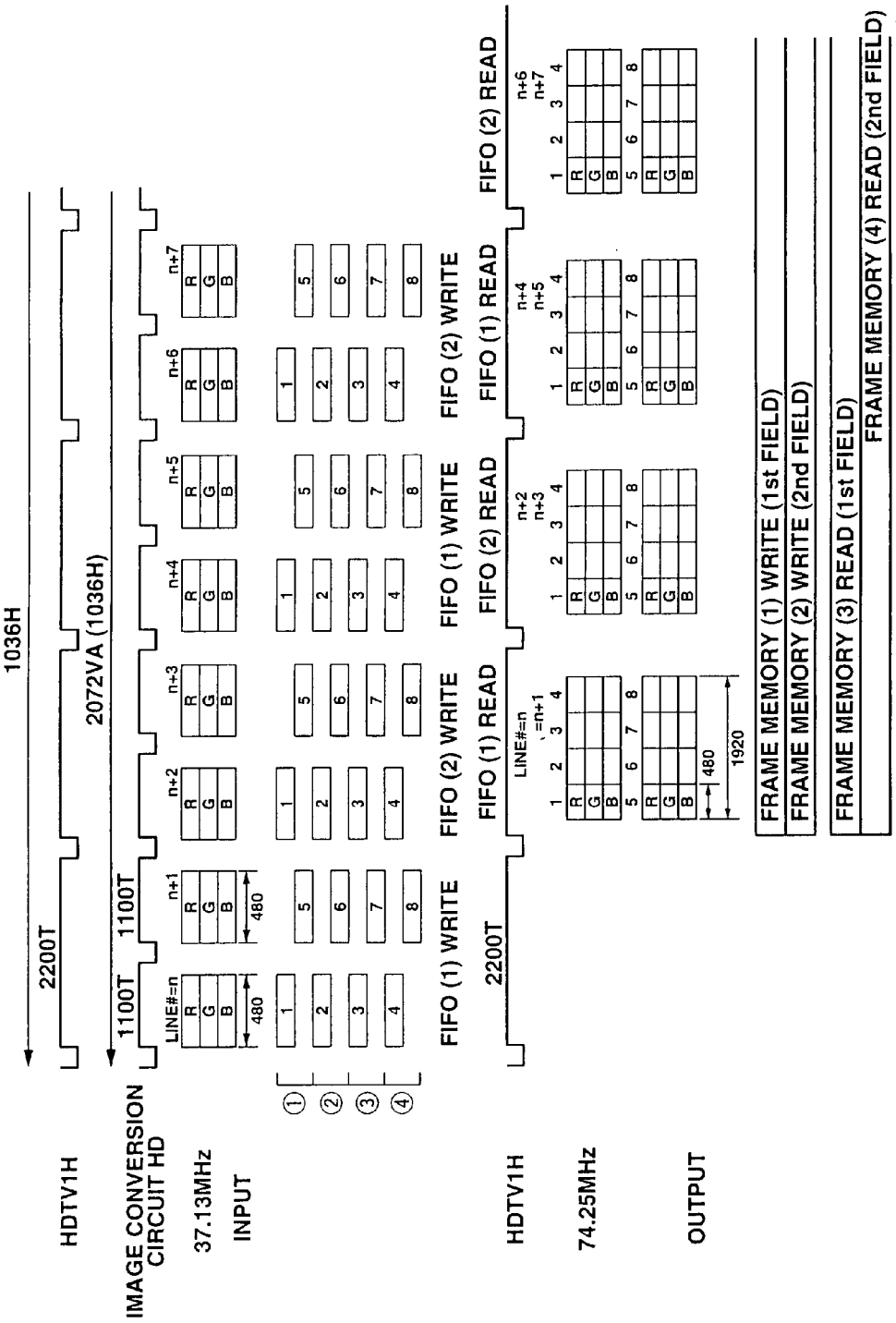
FIG. 14 is an explanatory operating diagram of the function of partial image display in the second embodiment.

As is shown in FIG. 14, the horizontal periods (1100T) of the image conversion circuits 30a through 30h are ½ the horizontal period (2200T) of the high-vision television.

Furthermore, the RGB signals (e.g., images of line n) output from the four image conversion circuits 30a through 30d in the horizontal period (1100T) are written into half of the FIFO memories (1) (e.g., simultaneously into the memories indicated by 1 through 4 in FIG. 14), and in the next horizontal period, the images of line n+1 are written into the remaining half of these FIFO memories (1) (simultaneously into the memories indicated by 5 through 8 in FIG. 14).

In the next horizontal period of the HDTV, the images of line n+2 and n+3 are similarly written using the FIFO memories (2).

Thus, the images of ① through ④ are written in two-line increments into each FIFO memory in each horizontal period of the HDTV.

Furthermore, while writing is being performed into one set of the FIFO memories, reading of the written image is performed from the other set of the FIFO memories.

For example, in the horizontal period in which the images of n+2 and n+3 are written into the FIFO memories (2), the images are read out from the FIFO memories (1) into which lines n and n+1 have respectively been written (four memories for each line). Furthermore, reading is performed at a clock that is twice that used in the case of writing (37.13 MHz in the case of writing, 74.25 MHz in the case of reading).

The signals that have been read out are temporarily written into the frame memories (1) and (2). Furthermore, while writing is being performed into the frame memories (1) and (2), the images in the frame memories (3) and (4) are read out and displayed by the display device 32.

Thus, in the present embodiment, reduced images obtained by means of thinned images, or portions of images, i. e., partial images, can be displayed by the display device 32.

Figure 15:
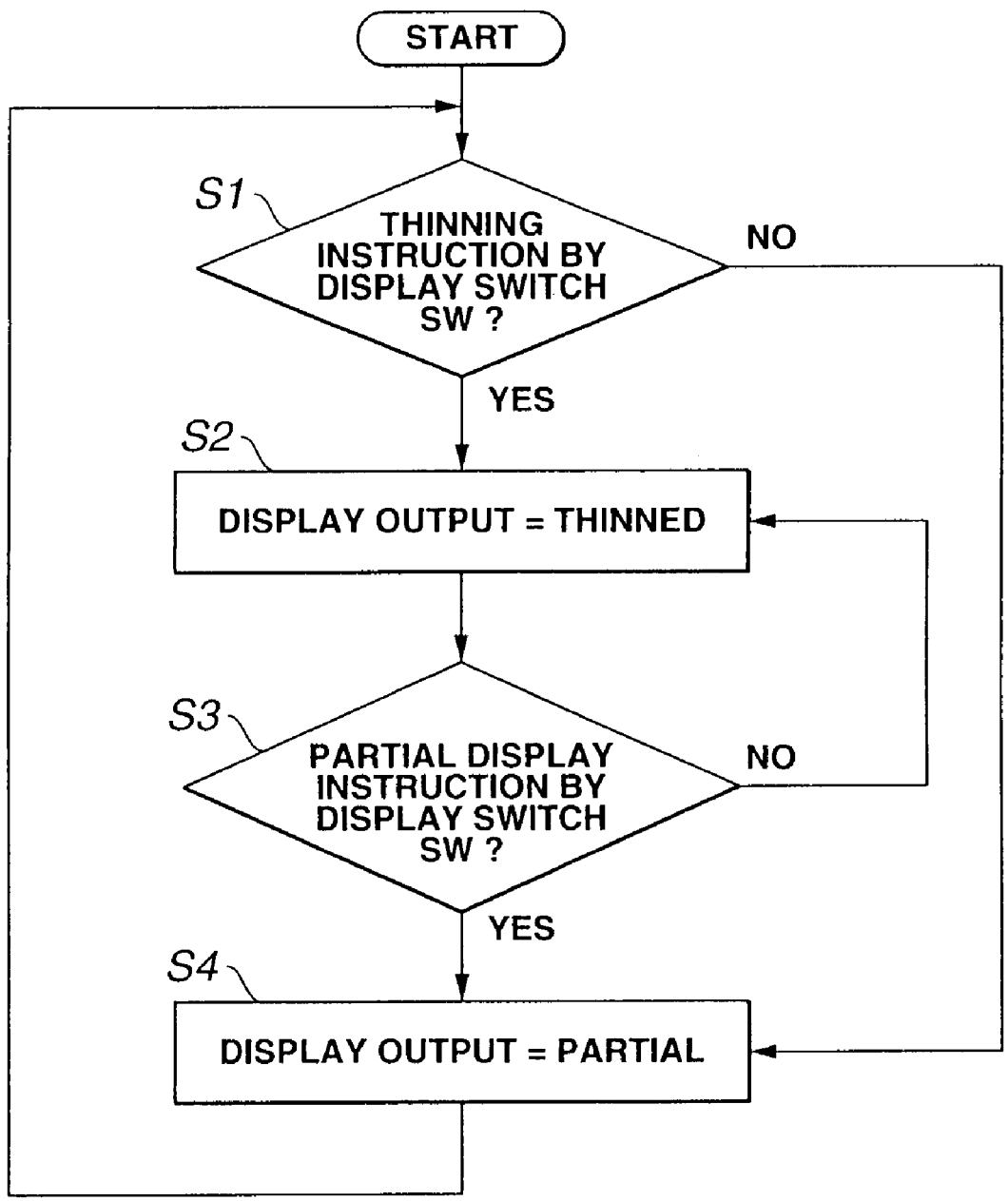
FIG. 15 is a flow chart which illustrates the operation whereby thinned images and partial images are switched and displayed by a switching operation in the second embodiment.

FIG. 15 shows a flow chart of the operation whereby thinned images or partial images are displayed from the overall image by means of the display switch SW34. When the display operation is started, the CPU 11 monitors the instruction signals of the display switch SW34 as shown in step S1. For example, the presence or absence of an initial thinning instruction by the operation of SW34 is monitored.

Then, if there is no such instruction, the processing shifts to step S4, and the CPU 11 performs a control action so that the display of a partial image is performed as the display output. On the other hand, when the display switch SW34 is operated, the CPU judges that a thinning instruction signal has been issued, and performs a control to display a thinned image as the display output as shown in step S2. Afterward, the CPU 11 performs a monitoring action in order to ascertain if there has been an instruction for a partial image by the operation of the display switch SW34 as shown in step S3.

Then, if the display switch SW34 has not been operated, the CPU 11 returns the processing to step S2, and controls such that the current display state is maintained. In the meantime, if the display switch SW34 is operated, the CPU 11 judges that there has been an instruction for a partial display; accordingly, the CPU 11 performs converting the display output into a partial image and this partial image is displayed as shown in step S4, after which the CPU 11 returns the processing to step S1.

Furthermore, in a second embodiment, when an operation that varies the zoom magnification is performed, the operating signal is input into the CPU 11, and the CPU 11 automatically performs a control for switching the display output from the overall image to a thinned image in the operation.

Figure 16:
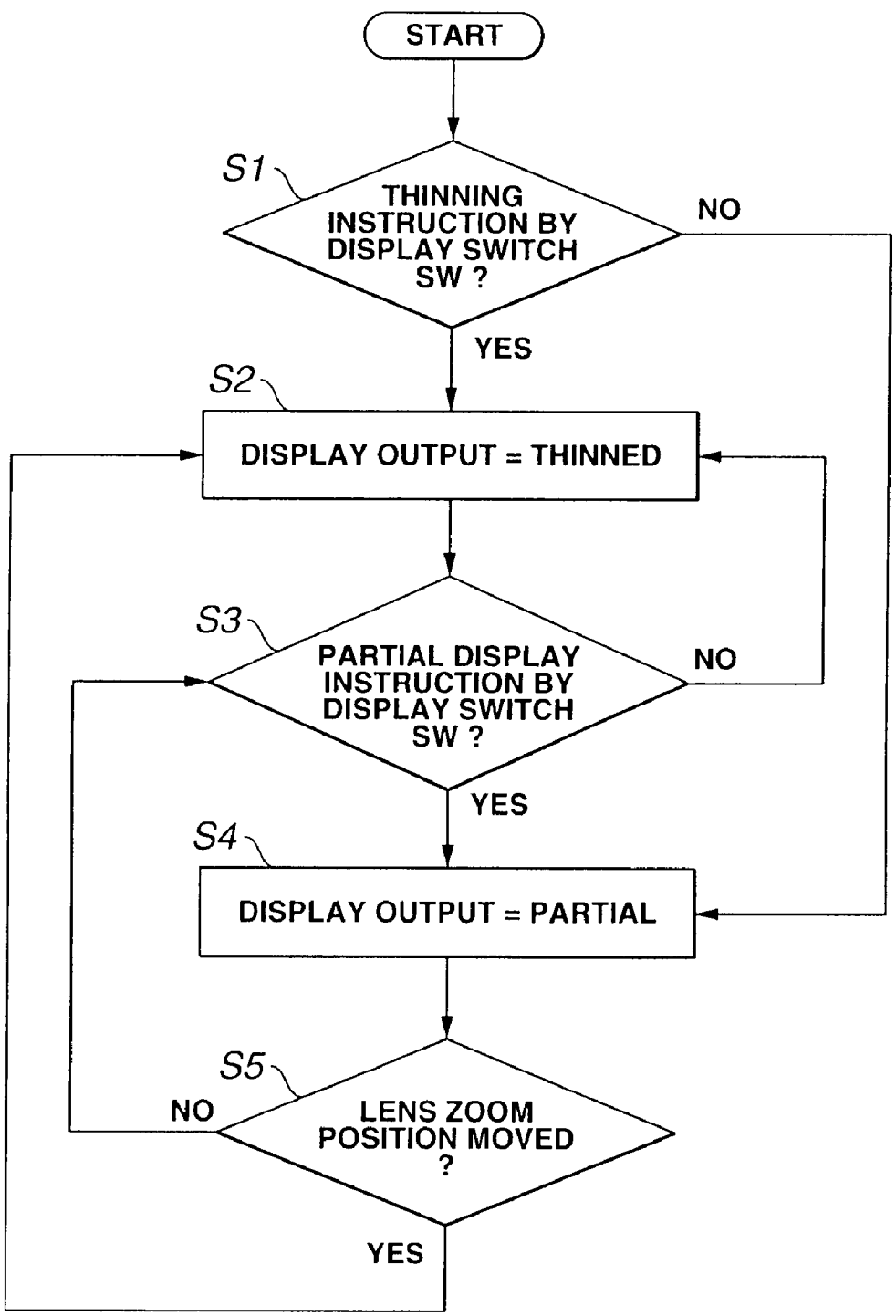
FIG. 16 is a flow chart which illustrates the operation whereby thinned images are displayed in cases where an operation that varies the zoom magnification is performed in the second embodiment.

A flow chart of the operation that is performed in this case is shown in FIG. 16. In this flow chart, processing which makes a judgment as to whether or not there has been any movement of the lens zoom position in step S5 is added after the processing of step S4 in FIG. 15.

Specifically, following the processing of step S4, the processing proceeds to step S5, and in this step S5, the CPU 11 makes a judgment as to whether or not there has been any movement of the zoom position. In cases where there has been such movement, the processing returns to step S2, and performs a control of displaying a thinned image. On the other hand, in cases where there has been no movement of the zoom position, the CPU 11 shifts the processing to step S3, and monitors the presence or absence of any operation of the display switch SW34.

As a result of such processing being performed, the CPU 11 switches the display to the display of a thinned image when a zoom operation is performed, so that adjustment of the magnification is facilitated for the user.

Furthermore, instead of the switching shown in FIG. 16, it would also be possible to arrange the system so that the cut-out position of the partial image that is being displayed is gradually moved toward the center position in cases where the zoom magnification is varied while such a partial image is being displayed.

Figure 17:
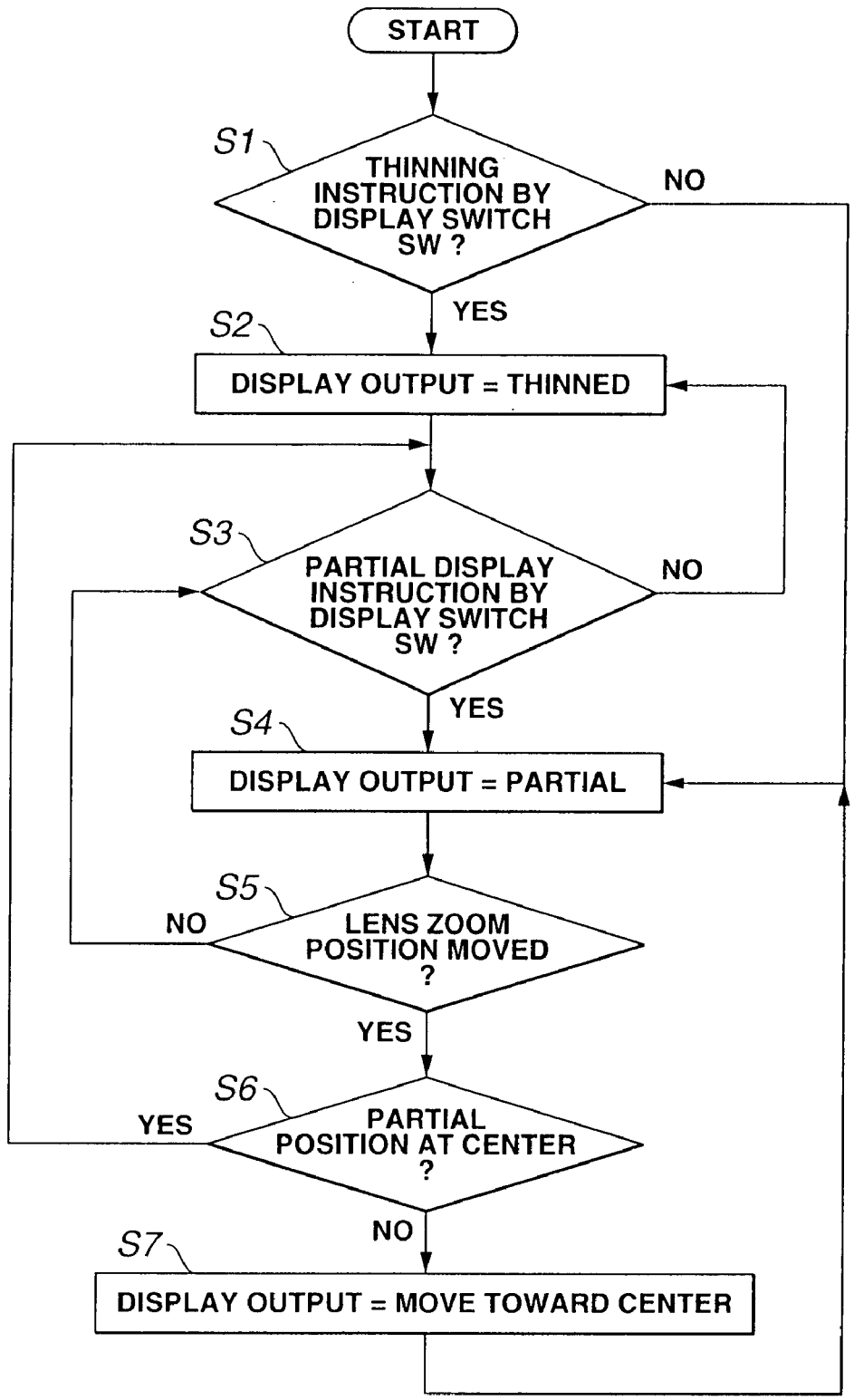
FIG. 17 is a flow chart which illustrates the operation that is performed in cases where the zoom magnification is varied while a partial image is being displayed in the second embodiment.

FIG. 17 shows the content of the operation that is performed in this case.

In the flow chart shown in FIG. 17, processing is performed in which steps S6 and S7 are added to the flow chart shown in FIG. 16.

Specifically, in step S5, the CPU 11 makes a judgment as to whether or not the zoom lens position has been moved. In cases where there has been no such movement, the CPU returns the processing to step S3; on the other hand, in cases where there has been such movement, the CPU 11 shifts the processing to step S6, and makes a judgment as to whether or not the area of the cut-out position is in the center. In cases where the cut-out position is in the center, the CPU 11 returns the processing to step S3, and the display of a partial image is continued. In cases where the cut-out position is not in the center position of the overall image, the CPU 11 shifts the processing to step S7, and processing is performed which moves the cut-out position of the partial image toward the center of the overall image, after which the CPU 11 returns the processing to step S4.

Thus, when there is movement of the zoom lens position, the CPU 11 performs a control action so that the cut-out position of the partial image is gradually moved toward the center of the overall image.

Figure 18A:
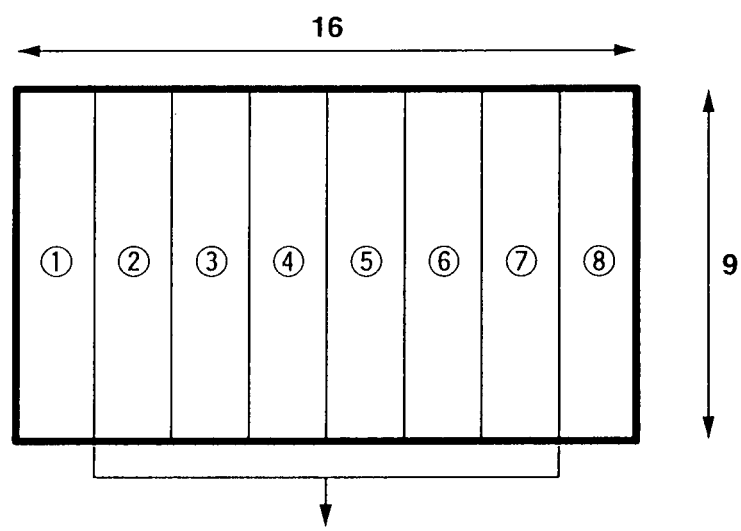
FIG. 18A is a diagram which shows how respective displayable images are output by display means with different aspects in the second embodiment.

Furthermore, in the present embodiment, as was described above, image-pickup elements that have an aspect of 16:9 are used as the image-pickup elements 8a through 8d, and the embodiment is constructed so that the overall image obtained from the image-pickup elements 8a through 8d is split into eight rectangular images (the image regions indicated by ① through ⑧) in the vertical direction by the image splitting circuit 15 as shown in FIG. 18A, and so that the images of the respective regions are further subjected to image processing in the image processing circuits 16a through 16h. Here, in the case of output to a monitor with an aspect of 16:9 used as the display device 32, the acquired images can easily be displayed on a full screen of this aspect by selecting all of the image regions indicated by ① through ⑧.

Figure 18B:
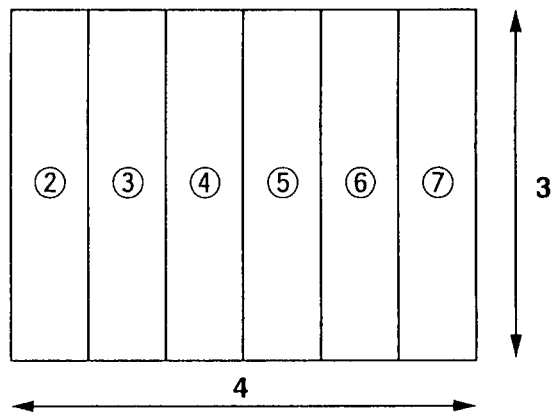
FIG. 18B is a diagram which shows how respective displayable images are output by display means with different aspects in the second embodiment.

Furthermore, in cases where the display device 32 is a television monitor with an aspect of 4:3, displaying a picked-up image can easily be accomplished in such a television monitor with an aspect of 4:3 by removing the image regions ① and ⑧ at both ends and using an image extending from the image region ② to the image region ⑦ as shown in FIG. 18B.

Specifically, in this second embodiment, eight image processing circuits 16a through 16h are used for a display device 32 with an aspect of 16:9; as a result, an image suited to the display screen can easily be produced. Alternatively, by using six image processing circuits 16b through 16g for a display device 32 with an aspect of 4:3, an image suited to the display screen of this display device can easily be produced.

Thus, this second embodiment can easily handle display means with two different aspects.

Furthermore, in cases where six image processing circuits 16b through 16g are used, the power supplies for the two image processing circuits 16a and 16h can be cut off so that the electric power consumption can be reduced. Furthermore, in this second embodiment, a case was described in which the image was split into eight parts; however, it would also be possible to split the image into an integer multiple of eight parts.

FIG. 19 shows the configuration of a first modification (image processing device 1C) of the image processing device of the abovementioned second embodiment.

The image processing device 1B of the abovementioned second embodiment had a configuration in which the output signals of the image processing circuits 16a through 16h were respectively input into the image conversion circuits 30a through 30h and displayed by the display device 32 as shown in FIG. 9. However, the present modification is arranged so that images recorded on the recording media 19a through 19h can be reproduced and displayed.

Accordingly, image reproduction circuits 41a through 41h which are connected to the recording media 19a through 19h, and which reproduce images, and image expansion circuits 42a through 42h which perform expansion processing on the output signals of the abovementioned image reproduction circuits 41a through 41h, are provided, and the system is arranged so that the output signals of the image expansion circuits 42a through 42h can be input into the image conversion circuits 30a through 30h and displayed by the display device 32.

The modification of the image processing device shown in FIG. 19 has a configuration in which a reproduction and expansion part 40 which performs reproduction and expansion processing on the recording media 19i is installed in addition to the recording part 4 and display part 5 in the image processing device of the second embodiment shown in FIG. 9. The remaining parts have the same configuration as the image processing device of the second embodiment shown in FIG. 9.

In this first modification, images recorded on the recording media 19a through 19h can be reproduced and displayed; accordingly, recorded images can be checked.

Figure 20:
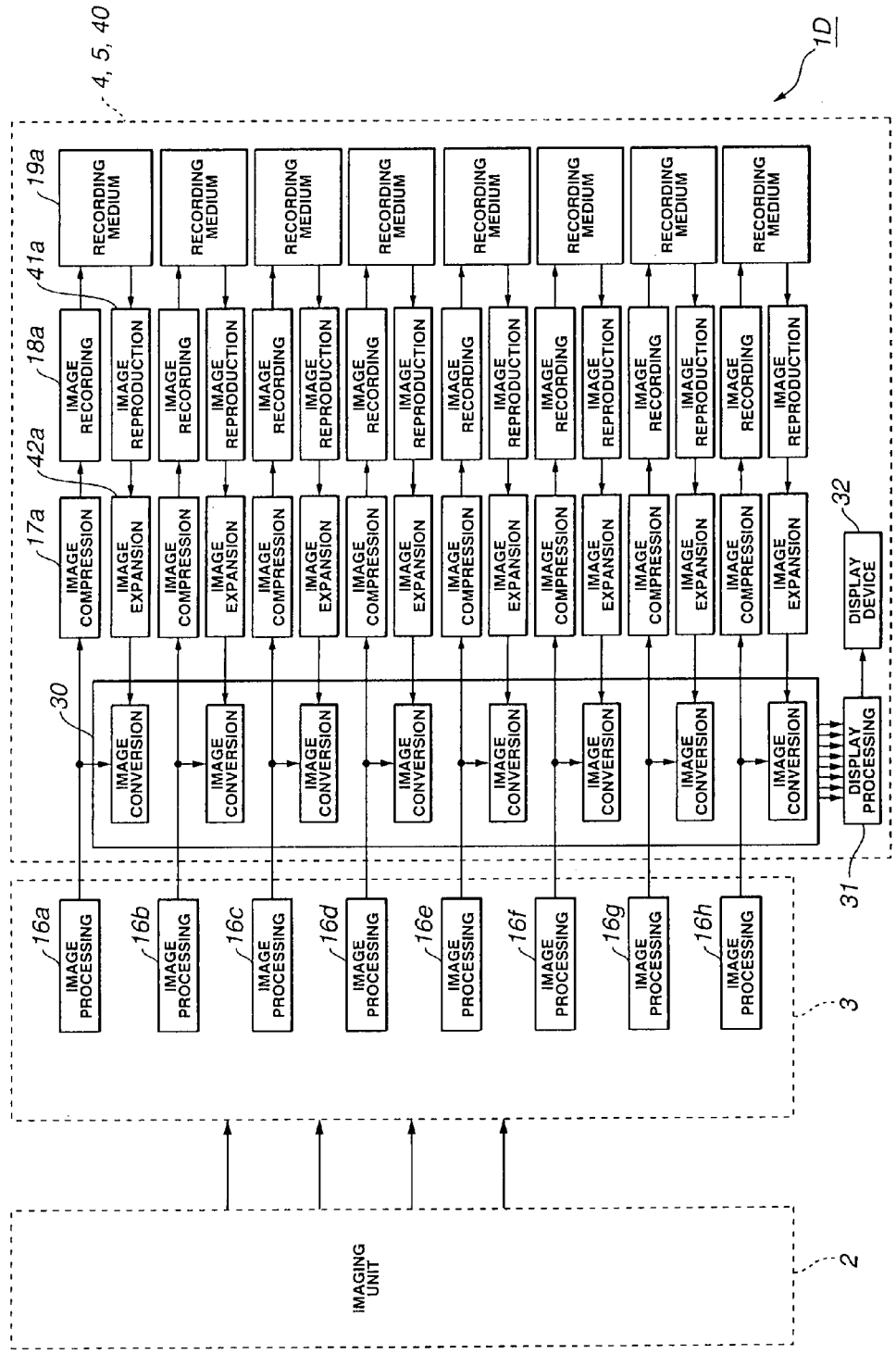
FIG. 20 is a block diagram which illustrates the configuration of the image processing device of a second modification of the second embodiment.

FIG. 20 shows the configuration of a second modification (image processing device 1D) of the image processing device of the abovementioned second embodiment.

This image processing device 1D is devised so that the signals of the image processing circuits 16a through 16h are further input into the image conversion circuits 30a through 30h in the image processing device 1C shown in FIG. 19. Furthermore, this modification is devised so that images recorded on the recording media 19i can be reproduced and displayed, and so that input images from the image processing circuits 16i can also be displayed, by means of a switch or the like not shown in the figures. The remaining parts have the same configuration as the first modification shown in FIG. 19.

In this second modification, picked-up images can be displayed, and images recorded on the recording media 19a through 19h can also be reproduced and displayed.

Next, a third embodiment of the present invention will be described.

Figure 21:
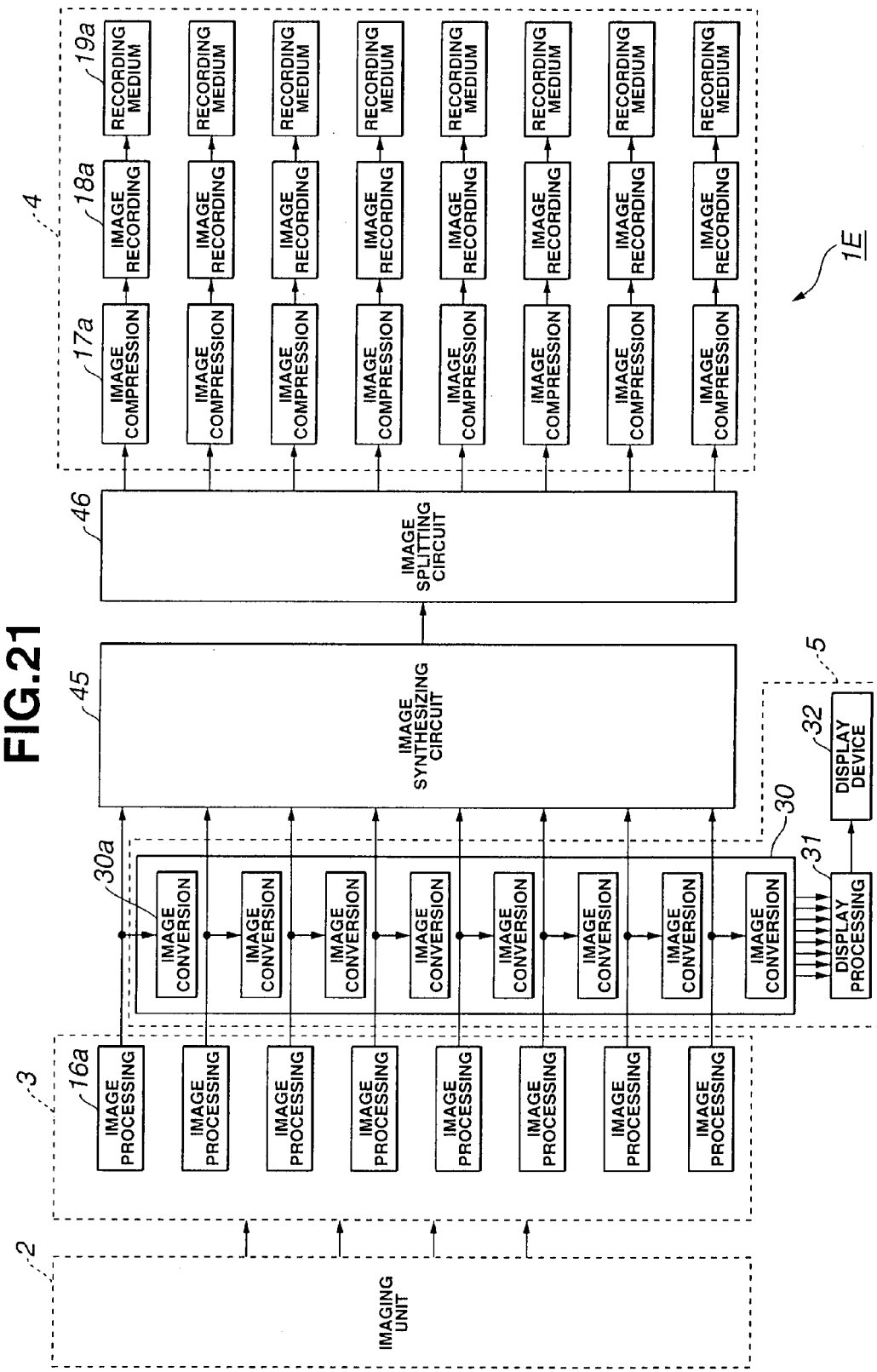
FIG. 21 is a block diagram which illustrates the overall configuration of the image processing device of a third embodiment of the present invention.

FIG. 21 shows the overall configuration of the image processing device of a third embodiment of the present invention. FIG. 22 is an explanatory diagram of the function of the image synthesizing circuit.

The image processing device 1E of the third embodiment of the present invention shown in FIG. 21 has a configuration in which an image synthesizing circuit 45 which synthesizes the plurality of split images produced by the image processing circuits 16a through 16h into a single image is provided in the image processing device 1B of the second embodiment of the present invention shown in FIG. 9, and in which an image splitting circuit 46 which splits the image synthesized by the abovementioned image synthesizing circuit 45 into a plurality of images is further provided; the split images produced by the splitting performed by this image splitting circuit 46 are compressed by a plurality of image compression circuits 17a through 17h, and recording processing is further performed by image recording circuits 18a through 18h so that the images are recorded on recording media 19a through 19h.

FIGS. 22A, 22B, 22C and 22D are explanatory diagrams of the function of the image synthesizing circuit 45.

In the eight split images produced by the respective image processing circuits 16a through 16h, as is shown in FIG. 22A, the size of the R, G and B color component images is (for example) 480×2160 pixels, and these split images are synthesized by the image synthesizing circuit 45 to form a single color image, i.e., three color component image.

As is shown by the arrows in FIG. 22A, respective R, G and B color component images with a size of 3840×2160 pixels are produced (see FIGS. 22B, 22C and 22D).

In this third embodiment, the side (image-pickup unit) which has an image-pickup part 2, signal control part 3 and display part 5, and the side (recording unit) which has a recording part 4, are separated by the image synthesizing circuit 45 and image splitting circuit 46; accordingly, a configuration is obtained in which the image-pickup unit and recording unit are detachable or easily separable via a connector or the like. Thus, by making the recording unit detachable with respect to the image-pickup unit, it is possible (for example) to change the recording medium to the recording medium of a large-capacity hard disk or the like, so that this configuration is suited to an expansion of the function of the device.

Furthermore, this third embodiment was applied to the image processing device 1B of the second embodiment shown in FIG. 9; however, it would also be possible to apply this third embodiment to the image processing device 1A of the first embodiment of the present invention shown in FIG. 1.

Figure 23:
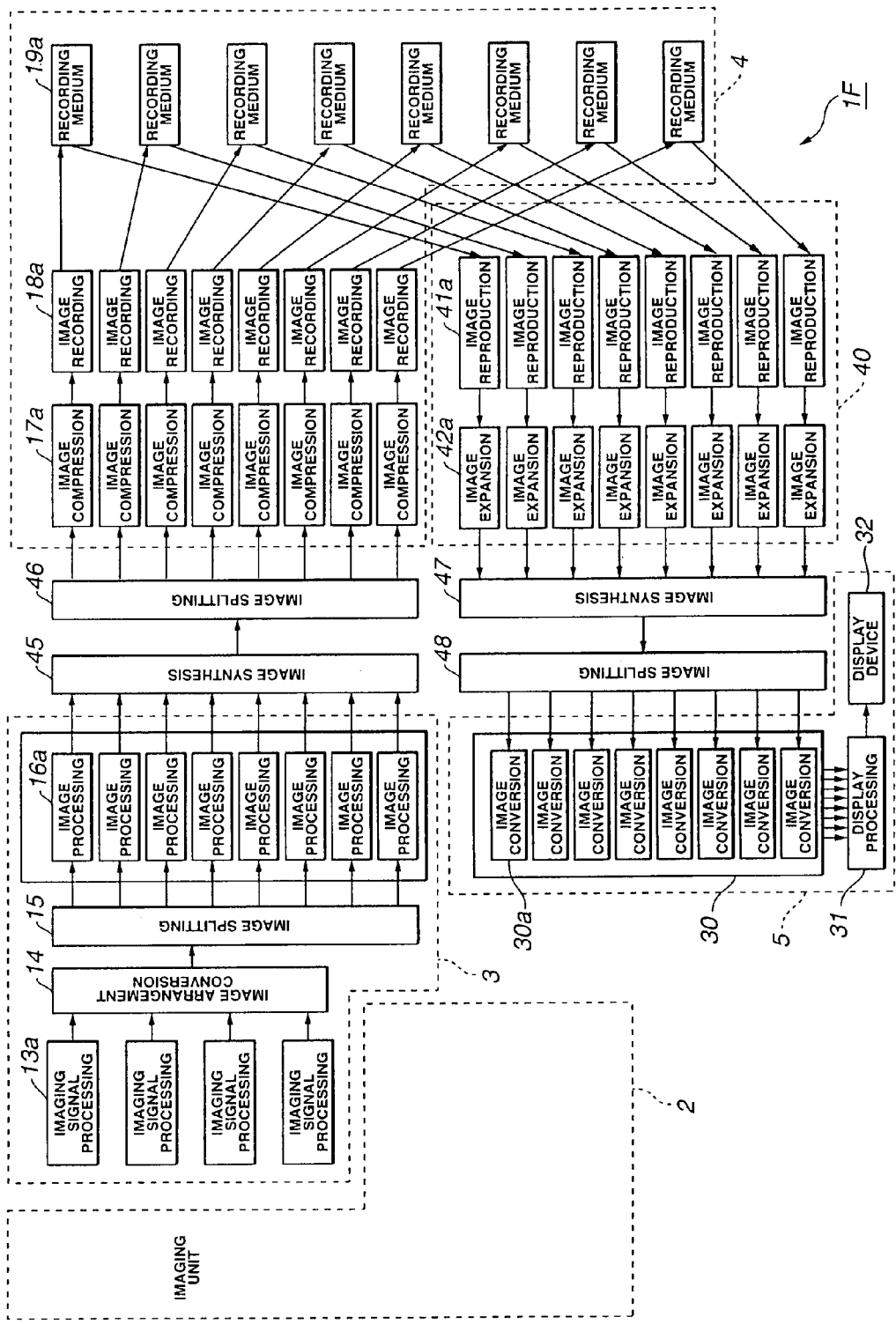
FIG. 23 is a block diagram which illustrates the configuration of the image processing device of a first modification of the third embodiment.

FIG. 23 illustrates the configuration of a first modification (image processing device 1F) of the image processing device of the abovementioned third embodiment.

In the image processing device 1F of this first modification, the reproduction and expansion part 40 shown in FIG. 19 is further installed in the image processing device 1E shown in FIG. 21. Specifically, image information that is compressed and recorded on the recording media 19a through 19h is reproduced by the image reproduction circuits 41a through 41h, and the output signals are expanded by the image expansion circuits 42a through 42h.

In the present modification, the output images of the image expansion circuits 42a through 42h are synthesized into a single image by the image synthesizing circuit 47. This image synthesizing circuit 47 is connected to the image splitting circuit 48 installed in the display part 5; the synthesize image is split into a plurality of images by this image splitting circuit 48, and these images are input into the image conversion circuits 30a through 30h. The output signals are input into the display device 32 via the image processing circuit 31.

In this first modification, the device has a configuration in which the side on which the image-pickup unit and the recording unit can be freely attached and detached. Furthermore, in this configuration, the recording unit and the display part 5 are also detachable. Accordingly, the recording media 19a through 19h of the recording part 4 can easily be changed, and the display device 32 or the like can also easily be changed. Furthermore, the recording part 4 or display part 5 that is connected and used can be changed in accordance with the use environment, so that more convenient parts can be selected and used.

FIG. 24 illustrates the configuration of a second modification (image processing device 1G) of the image processing device of the abovementioned third embodiment.

This image processing device 1G is a modification of the image processing device 1F in FIG. 23, and constructed so that the output signals from the image processing circuits 16a through 16h are input into the image conversion circuits 30a through 30h, thus making it possible to display image-picked-up signals as well on the display device 32. In this second modification, in addition to the effects and merits of the abovementioned first modification, it is also possible to display image-picked-up signals on the display device 32.

Furthermore, in FIG. 24, a configuration is shown in which the output signals from the image processing circuits 16a through 16h are input into the image conversion circuits 30a through 30h; however, it would also be possible to use a configuration in which the output of the image synthesizing circuit 45 is input into the image splitting circuit 48. In other words, it is possible to connect the image splitting circuit 46 of the freely detachable recording part 4 to the image synthesizing circuit 45 so that images can be recorded on the recording media 19a through 19h, or to connect the image splitting circuit 48 of the freely detachable display part 5 to the image synthesizing circuit 45 so that picked-up images can be displayed by the display device 32.

Furthermore, it would also be possible to use a configuration in which two connectors are installed in the image splitting circuit 48 of the display part 5, with one connector being installed so that this connector can be freely attached to or detached from a connector in the image synthesizing circuit 47 of the recording part 4, and with the other connector being installed so that this connector can be freely attached to or detached from a connector in the image synthesizing circuit 45 of the signal processing part 3. Furthermore, it would also be possible to install a selection switch, so that image signals input from the one connector that is selected can be displayed by the display device 32.

Next, a fourth embodiment of the present invention will be described.

FIGS. 25A, 25B and 25C show how image splitting is performed by providing a portion that partially overlaps with an adjacent split image in a fourth embodiment of the present invention. FIG. 26 is an explanatory diagram of the writing operation into the FIFO memories that make up the image splitting circuit in this case. FIG. 27 is an explanatory diagram which shows how pixels of portions that overlap pixels in the vicinity of the ends of the respective split image regions are utilized in image processing.

The image processing device of this fourth embodiment has the same configuration as (for example) the image processing device 1A shown in FIG. 1, but differs from this image processing device 1A in that image splitting is performed by providing a portion that partially overlaps with an adjacent split image as described below.

Specifically, for example, eight image regions ①through ⑧ are produced as split images by the image splitting circuit 15 as shown in FIG. 25A; in this case, however, splitting is performed so that the boundary areas are partially overlapped with an adjacent split image as indicated by the shading in FIG. 25A. Furthermore, in the image regions ① and ⑧ at both ends, the peripheral pixels that are outside the pixels actually displayed are also included.

For example, in the abovementioned first embodiment of the present invention, as is shown in FIG. 25B, no overlapping portions exist at the boundaries of the split images. However, in this fourth embodiment, as is shown in FIG. 25C, split images are produced so that pixels located outside the boundaries of the split images, i.e., pixels contained in regions of adjacent split images in the first embodiment, are also included in the split images.

In cases where overlapping portions are not provided, the writing of the split images into the FIFO memories 22 making up the image splitting circuit 15 is performed as indicated by the timing chart shown in FIG. 6. However, in cases where overlapping portions are provided as in the present embodiment, the "write" operation is performed according to the timing chart shown in FIG. 26.

As is seen from a comparison with FIG. 6, the pulse width of the write pulse is wider, and two adjacent FIFO memories 22 are simultaneously in a writing state in the vicinity of the boundaries. Furthermore, the FIFO memories 22 into which the split images ① and ⑧ are written are also arranged so that pixels that are located to the outside of the ends of the split images ① and ⑧ are written.

Furthermore, in regard to the number of pixels that are incorporated by overlapping, the number of pixels that are necessary for the image processing of adjacent pixels are incorporated as a unit as shown in FIG. 27. For example, in the case shown in FIG. 27, two pixels in the vertical and horizontal directions, i.e., 2×2 pixels, constitute a unit of arrangement. In this case, therefore, an amount equal to two pixels from the boundary may be set as the amount of overlapping. Furthermore, the number of pixels that are incorporated from outside the ends of the split images ① and ⑧ may also be the same as this amount of overlapping.

As a result of the respective split image regions thus being formed so that the respective image regions are caused to overlap (including partial regions to the outside of the regions at both ends), color signals can be produced simply and quickly even for the case of pixels at the ends of the respective image regions by using the pixels of the outside overlapping portions, wherein image processing that produces three color signals from the signals of the respective split image regions by means of the respective image processing circuits 16i from a single color component by interpolation using the color components of peripheral pixels is performed.

Even if there are no overlapping portions, the required pixels from adjacent image regions can be incorporated to produce color signals. However, the respective image processing circuits 16i cannot perform processing in parallel for this incorporation; accordingly, the processing becomes complicated, and the processing speed drops. Furthermore, since no outside pixels are incorporated in the pixels at each end of the two image regions (① and ⑧)) located at both ends facing the outside, the image quality also drops in this case.

In contrast, by incorporating into the respective FIFO memories 22 an excess pixel size that exceeds the size of the respective image regions by the amount that is necessary for image processing that produces color signals for the pixels at the ends by interpolation as described above, it is possible to perform image processing simply and quickly. Furthermore, by incorporating only the number of pixels constituting the pixel size that is required for image processing, and not incorporating any greater excess number of pixels, it is possible to avoid an increase in the scale of the circuit.

Next, a fifth embodiment of the present invention will be described.

Figure 28:
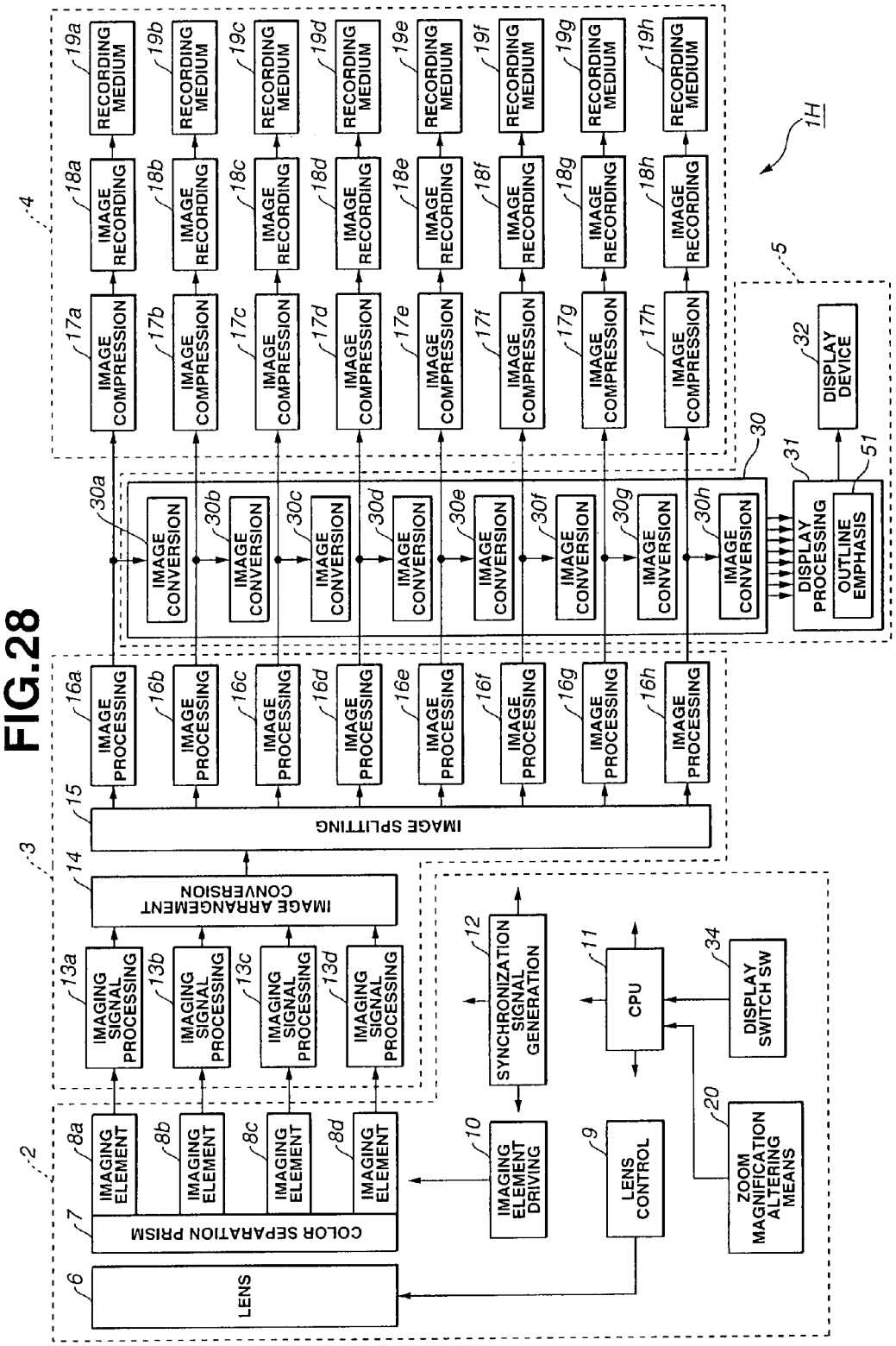
FIG. 28 is a block diagram which illustrates the overall configuration of the image processing device of a fifth embodiment of the present invention.
Figure 29:
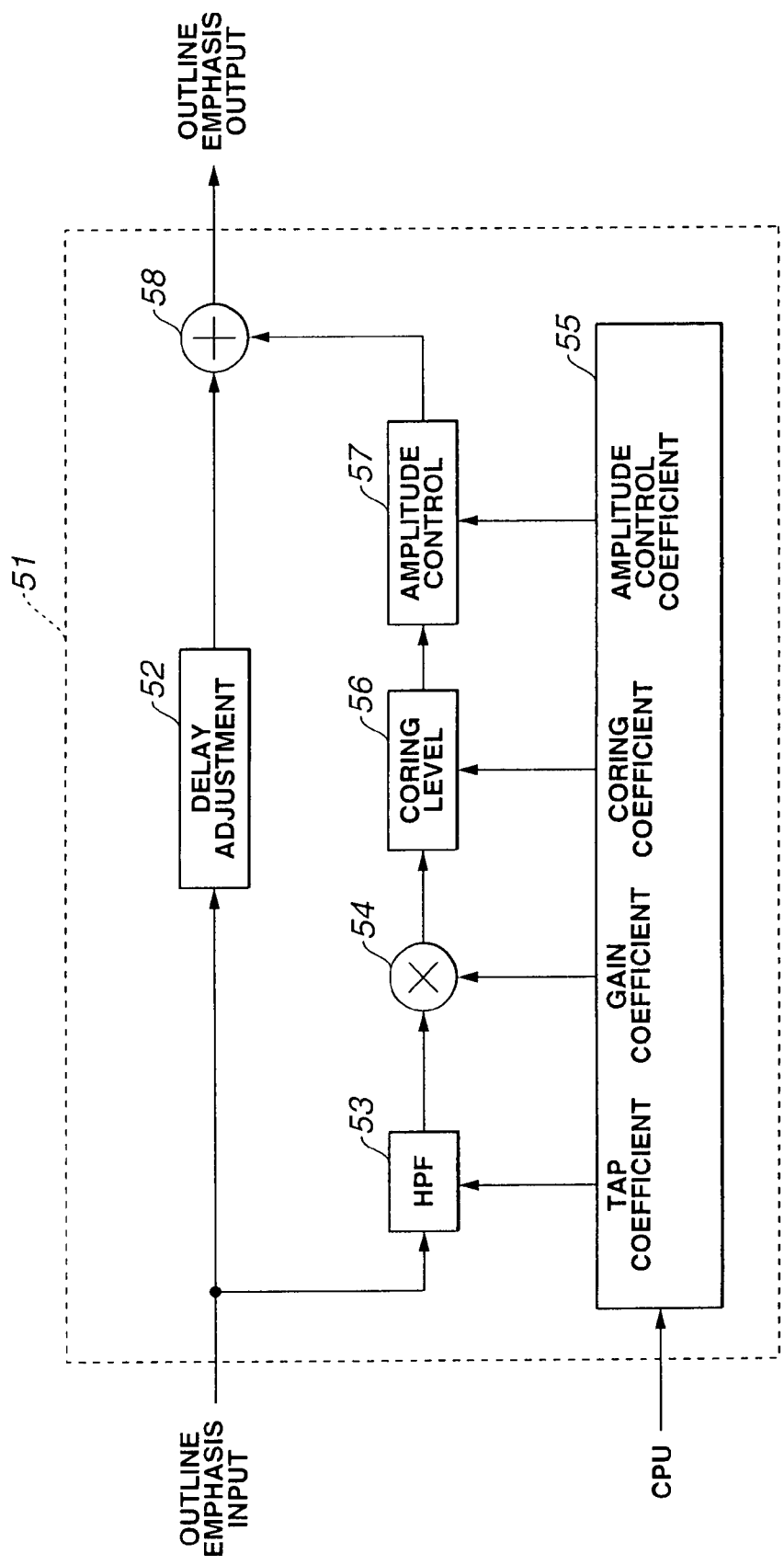
FIG. 29 is a block diagram which illustrates the configuration of the outline emphasis circuit in the fifth embodiment.
Figure 30:
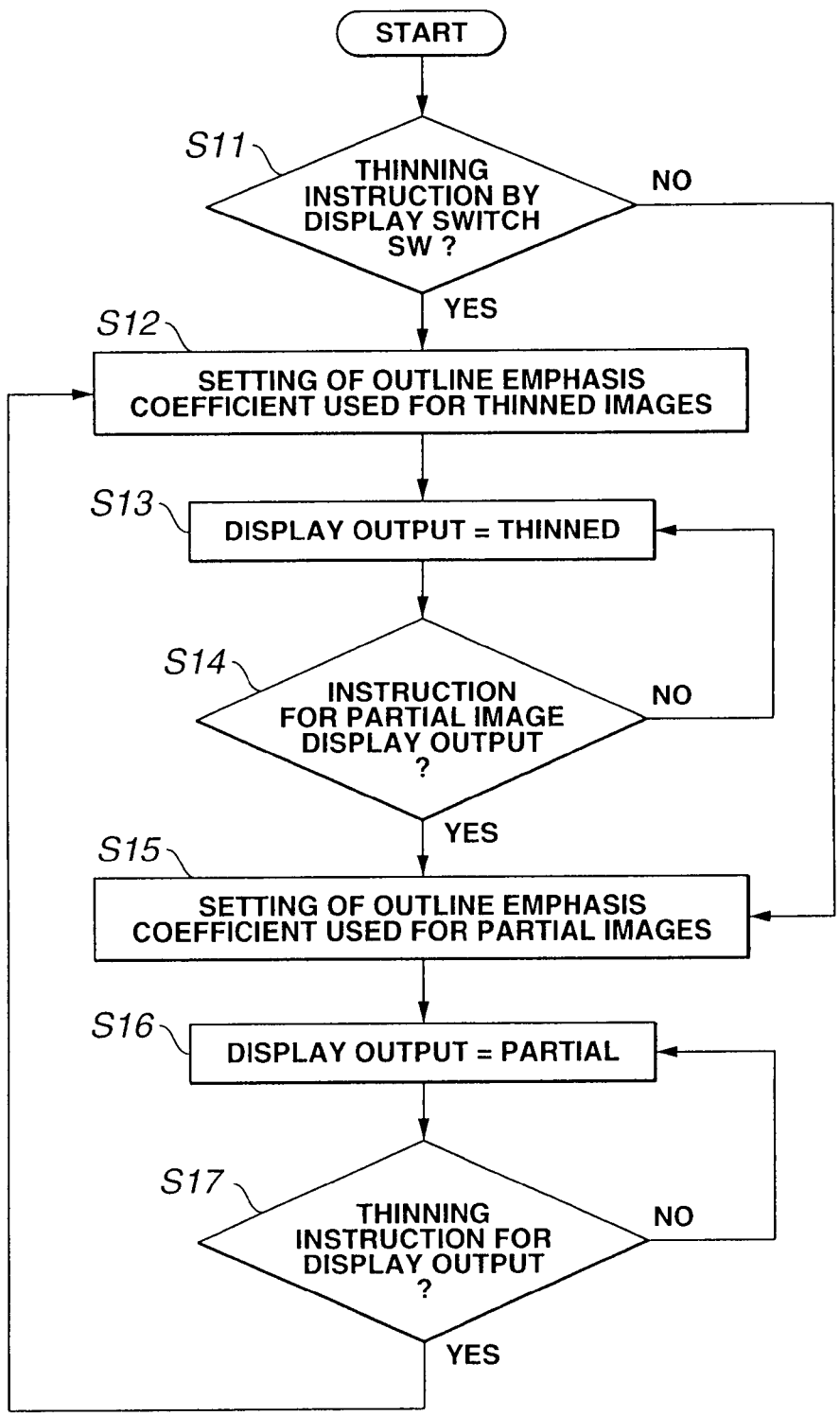
FIG. 30 is a flow chart which illustrates the content of the operation performed in the fifth embodiment.

FIG. 28 shows the configuration of the image processing device of this fifth embodiment. FIG. 29 shows the configuration of the outline emphasis circuit, and FIG. 30 is a flow chart showing the content of the operation.

In the image processing device 1H of the fifth embodiment shown in FIG. 28, the image processing circuit 31 in the image processing device 1B shown in FIG. 9 is equipped with an outline emphasis circuit 51 which performs outline emphasis. The configuration of this outline emphasis circuit 51 is shown in FIG. 29.

The input signal that is input into the outline emphasis circuit 51 is input into a delay adjustment circuit 52 which adjusts the amount of delay, and is also input into a high-pass filter 53. The output signal of this HPF 53 is input into a multiplier 54. A tap coefficient from a coefficient setting circuit 55 is input into the HPF 53. Furthermore, this coefficient setting circuit 55 outputs a gain coefficient when multiplication is performed by the multiplier 54.

Following multiplication by the multiplier 54, the input signal is input into a coring level 56. The coring level 56 sets a coring level by a coring level coefficient from the coefficient setting circuit 55. Furthermore, the output signal of this coring level 56 is input into an amplitude limiting circuit 57, and the amplitude level is limited by the amplitude limiting circuit 57 using an amplitude control coefficient from the coefficient setting circuit 55. Afterward, the signal is input into an adder 58, and is added to the output signal of the delay adjustment circuit 52 so that a signal with an emphasized outline is output.

The respective coefficients of the abovementioned coefficient setting circuit 55 are set by the CPU 11. In the present embodiment, the CPU 11 sets the respective coefficients of the coefficient setting circuit 55 in accordance with the selection of a thinned image or partial image; in the case of a thinned image, the level of outline emphasis is reduced, while in the case of a partial image, the level of outline emphasis is increased.

FIG. 30 shows the operation that is performed in this case.

When the operation is started, the CPU 11 makes a judgement in an initial step S11 as to whether or not there has been a thinning instruction by the operation of the display switch SW34. If there has been no such instruction, the processing shifts to step S15; conversely, if there has been such an instruction, the processing proceeds to the next step S12.

In step S12, the CPU 11 sends a control signal to the coefficient setting circuit 55, and sets the outline emphasis coefficient to the outline emphasis coefficient used for a thinned image. Afterward, in the next step S13, the CPU 11 switches the display output to a thinned image, i.e., switches the system so that a thinned image is output to the display device 32.

Then, in the next step S14, the CPU 11 makes a judgement as to whether or not there has been an instruction for the display output to be a partial image. In cases where there has been no such instruction, the processing returns to step S13, and the display of a thinned image is continued. Conversely, in cases where there has been an instruction to make the display output to be a partial image, the CPU 11 sends a control signal to the coefficient setting circuit 55 in the next step S15, and sets the outline emphasis coefficient to the outline emphasis coefficient used for a partial image; in more concrete terms, the CPU 11 makes a setting that increases the level of outline emphasis compared to that used in the case of a thinned image. Then, in the next step S16, the CPU 11 switches the display output to a partial image, i.e., switches the system so that a partial image is output to the display device 32.

Then, in the next step S17, the CPU 11 makes a judgement as to whether or not there has been an instruction for the display output to be a thinned image. In cases where there has been no such instruction, the processing returns to step S16, and the display of a partial image is continued. Conversely, if there has been an instruction to make the display output to be a thinned image, the processing returns to step S12, and the outline emphasis coefficient is set to the outline emphasis coefficient used for a thinned image.

As a result of the level (intensity, magnitude) of outline emphasis thus being altered to different values in the case of a thinned image and the case of a partial image, with the level being set at levels that are suitable for the respective images, the respective images can be clearly observed when thinned images and partial images are displayed, and even if moire or the like is generated, the images can be displayed so that such moire is not noticeable.

Next, a sixth embodiment of the present invention will be described.

FIG. 31 shows the configuration of the image processing device of the sixth embodiment, and FIGS. 32A, 32B, 32C, 32D and 32E are explanatory diagrams of the shading correction operation.

In the image processing device 1I of the sixth embodiment shown in FIG. 31, a shading correction circuit 56 that performs optical shading correction on the image-pickup signal processing circuits 13a through 13d is installed in the image processing device 1B shown in FIG. 9. The remaining parts have the same configuration as in FIG. 9.

Although the brightness level of the incident light is constant even if the distance from the optical axis varies, as is shown in FIG. 32A, the brightness level at the light-receiving surface decreases with increasing of distance from the optical axis as is shown in FIG. 32B.

Accordingly, in this sixth embodiment, as is shown in FIG. 32C, the correction coefficient that is used when shading correction is performed by the shading correction circuit 56 is increased as the distance from the optical axis increases, so that the brightness after correction is constant even if the distance from the optical axis varies, as is shown in FIG. 32D.

By performing such optical shading correction, it is possible to obtain images in which there is no darkening of the peripheral portions.

Furthermore, it is also possible to perform shading correction on the post-stage side, e.g., on the side of the image processing devices 16a through 16h; in such a case, however, correction coefficients corresponding to the respective regions of the split images processed by the image processing device 16a through 16h must be set as shown (for example) in FIG. 32E, as a result it is difficult to perform shading correction using the same circuit configuration. On the other hand, if the system is devised so that shading correction is performed by the image-pickup signal processing circuits 13a through 13d on the pre-stage side of image splitting as shown in FIG. 31, then shading corrections can be performed using the same circuit configuration, so that the circuit configuration can also be simplified.

Furthermore, the following merit is also obtained: namely, it is easily possible to realize the function of so-called "sensitivity-shading correction" which corrects not only the optical shading, but also the variation in sensitivity from image-pickup element to image element.

Next, a seventh embodiment of the present invention will be described.

The image processing device 1J of the seventh embodiment shown in FIG. 33 has a configuration in which the output of the image synthesizing circuit 45 in the image processing device 1E shown in FIG. 21 is converted into a plurality of images, specifically four images in accordance with the video signals, by an image distribution circuit 61, and these images are output four display devices (1) 62*a* through (4) 62*d*. For the sake of simplicity, the display devices will be indicated as (1) through (4) below.

Figure 34B:
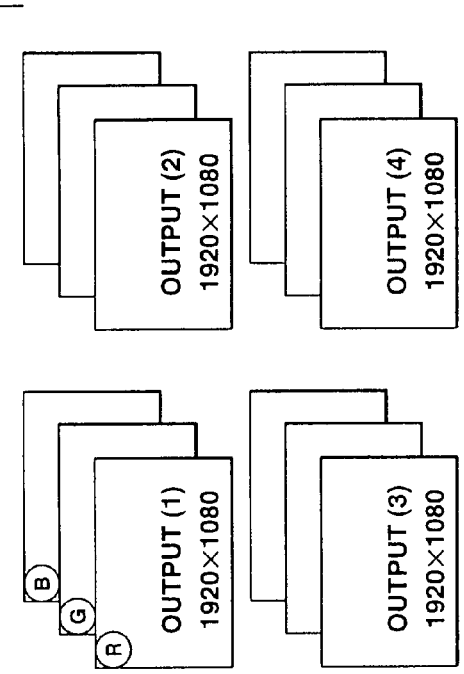
FIG. 34B is a diagram which illustrates the function of the image distribution circuit in the image processing device of the seventh embodiment.
Figure 34C:
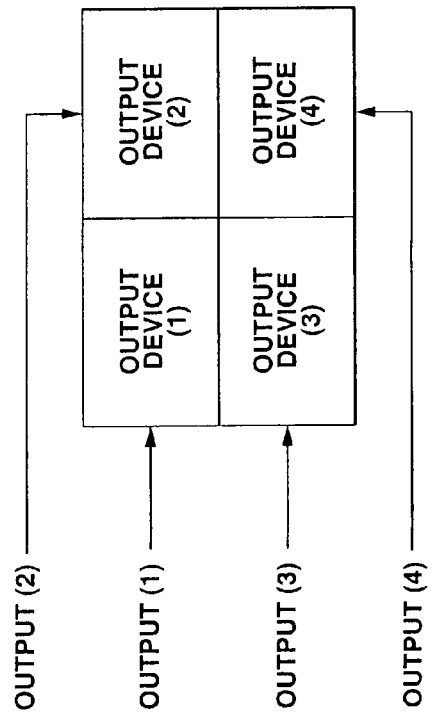
FIG. 34C is a diagram which illustrates the function of the image distribution circuit in the image processing device of the seventh embodiment.
Figure 34A:
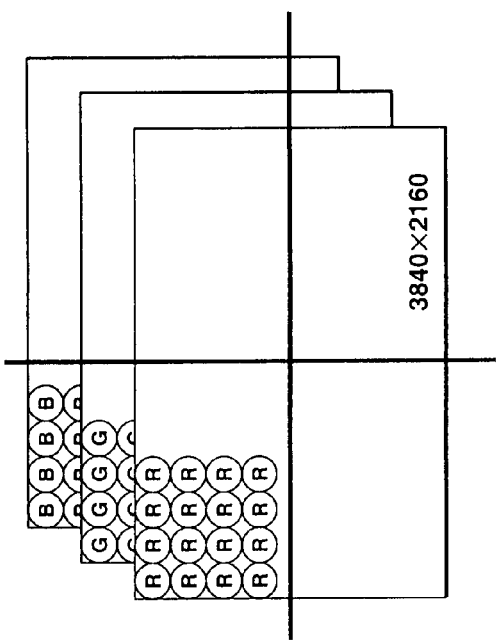
FIG. 34A is a diagram which illustrates the function of the image distribution circuit in the image processing device of the seventh embodiment.

FIGS. 34A, 34B and 34C illustrate the function of the image distribution circuit 61 of the image processing device 1J of the seventh embodiment. As is shown in FIG. 34A, the image distribution circuit 61 distributes the overall images of R, G and B into (for example) images of four regions indicated by the thick lines, and the four outputs (1) through (4) are output to the display devices (1) through (4) as shown in FIG. 34B.

Accordingly, by disposing the display devices (1) through (4) as shown in FIG. 34C, it is possible to display an overall image similar to the image prior to distribution without reducing the image.

FIGS. 35A, 35B and 35C show the function of the image distribution circuit 61 in a modification of the abovementioned seventh embodiment. The present modification is characterized in that the system is constructed so that a plurality of substantially identical reduced images (four images in this case) can be obtained by reading out the overall image with thinning applied. In this case, the overall images of R, G and B are distributed and output with (for example) every other pixel thinned in the horizontal and vertical directions as shown in FIG. 35A. FIG. 35A illustrates the abovementioned operation. The reduced image of output (1) is obtained by reading out the pixels indicated by the symbol 1, and the reduced image of output (2) is obtained by reading out the pixels indicated by the symbol 2. The same is true in the case of the symbols 3 and 4.

The four outputs (1) through (4) shown in FIG. 35B, which are obtained by thinning every other pixel in this way, are reduced images that are shifted by one pixel relative to each other. To the eye, however, these outputs appear to be substantially identical images. These outputs (1) through (4) are output to display devices (1) through (4) as shown in FIG. 35C, and identical images are displayed on these display devices.

Furthermore, in the above description, a case was described in which higher-definition images were produced by using a plurality of image-pickup elements, these higher-definition images were split into a plurality of image regions, and the images of the split image regions were respectively subjected to image processing and the like. However, it would also be possible to arrange the system so that the output signal of an image-pickup element that produces a single high-definition image is split into a plurality of image regions, and the images of the respective split image regions are respectively subjected to image processing and the like.

In this invention, it is apparent that working modes different in a wide range can be formed on the basis of this invention without departing from the spirit and scope of the invention. This invention is not restricted by any specific embodiment except as limited by the appended claims.

What is claimed is:

1. An image processing device which obtains a single image by using a plurality of image-pickup elements, comprising:
   a plurality of image-pickup signal processing circuits that are provided for each of the image-pickup elements;
   an image arrangement conversion circuit which converts the read-out order of the images corresponding to the respective image-pickup elements that are output from said image-pickup signal processing circuits;
   image splitting means for performing image splitting on the image that is output from said image arrangement conversion circuit;
   image processing means for performing image processing in parallel on each of said split images; and
   image compression means for compressing in parallel each of the split images that are output from said image processing means,
   wherein said image splitting means performs image splitting with overlapping parts formed for peripheral regions of each single split image and adjacent regions that are adjacent to other split images.

2. The image processing device according to claim 1, wherein the amount of said overlapping is set by the number of pixels required for the image processing of adjacent pixels.

\* \* \* \* \*